(12) United States Patent
Ichioka et al.

(10) Patent No.: US 7,369,749 B2
(45) Date of Patent: May 6, 2008

(54) SYSTEM AND METHOD FOR RECORDING AND REPRODUCING BROADCASTING PROGRAMS

(75) Inventors: Hidetoshi Ichioka, Tokyo (JP); Hideki Asazu, Tokyo (JP); Masaki Ishida, Kanagawa (JP)

(73) Assignee: Sony Corporation, Tokyo (JP)

( * ) Notice: Subject to any disclaimer, the term of this patent is extended or adjusted under 35 U.S.C. 154(b) by 1143 days.

(21) Appl. No.: 09/863,044

(22) Filed: May 22, 2001

(65) Prior Publication Data

US 2002/0009283 A1 Jan. 24, 2002

(30) Foreign Application Priority Data

May 23, 2000 (JP) .............................. 2000-150726

(51) Int. Cl.
*H04N 5/91* (2006.01)
(52) U.S. Cl. .......................................... 386/83; 386/95
(58) Field of Classification Search .................. 386/46, 386/83, 95, 68, 69
See application file for complete search history.

(56) References Cited

U.S. PATENT DOCUMENTS

| 4,873,584 | A | * | 10/1989 | Hashimoto | .................... 386/83 |
|---|---|---|---|---|---|
| 5,390,027 | A | * | 2/1995 | Henmi et al. | .................. 386/65 |
| 5,977,964 | A | * | 11/1999 | Williams et al. | ............. 715/721 |
| 5,999,691 | A | * | 12/1999 | Takagi et al. | .................. 386/46 |
| 6,240,240 | B1 | * | 5/2001 | Nagano et al. | ................ 386/83 |
| 6,564,005 | B1 | * | 5/2003 | Berstis | ......................... 386/83 |
| 6,801,713 | B1 | * | 10/2004 | Yagawa et al. | ................ 386/69 |

FOREIGN PATENT DOCUMENTS

| JP | 09-180292 | * | 7/1997 |
|---|---|---|---|
| WO | WO 92/22983 | * | 12/1992 |

* cited by examiner

*Primary Examiner*—Huy Nguyen
(74) *Attorney, Agent, or Firm*—Frommer Lawrence & Haug LLP; William S. Frommer; Thomas F. Presson

(57) ABSTRACT

There is provided a system for recording and/or reproduction of broadcasting programs permits the facilitation of selection and management of recorded videos in the manner of following the operations of general AV equipment such as televisions and video decks, in which virtual channels are assigned according to categories defined by a user, and programs corresponding to the categories are recorded into the virtual channels, and since the recorded programs are set in array on a time base for simultaneous reproduction on each virtual channel, the user may happen to watch various recorded programs only by switching over the channels from one to another or continuing to reproduce recorded programs in a single channel after application of power at any time, which results in quite passive style only sufficient for the user to watch the recorded programs.

56 Claims, 22 Drawing Sheets

FIG. 16

```
class SchedulingUnit {
        Time startTime;
        long durationTime;
        int status;
        String title;
        Set categories;
        TVContent source;
}
```

FIG.17

```
class PlayUnit {
        MediaLocator media;
        long startPosition;
        long durationTime;
        long currentPosition;
}
```

FIG. 18

```
class TVContent {
        long id;
        Time startTime;
        Time endTime;
        int channel;
        String Title;
        Set categories;
        String description;
        MedIaLocator media;
        long mediaOffset;
        Int status;
        Time reservedTime;

```
class ToWatchListEntry {
        long currentPosition;
        String Title;
        long durationTime;
        int status;
        TVContent source;
}
```

SYSTEM AND METHOD FOR RECORDING AND REPRODUCING BROADCASTING PROGRAMS

CROSS REFERENCE TO RELATED APPLICATIONS

This application claims priority from Japanese Patent Application No. 2000-150726, filed on May 23, 2000 with the Japanese Patent Office, the disclosure of which is expressly incorporated by reference.

BACKGROUND OF THE INVENTION

1. Field of the Invention

This invention relates to a system and a method for recording and/or reproducing videos of broadcasting programs or the like sent on the air from broadcasting stations, and in particular, to a recording/reproducing system, which permits the automated video recording and recording schedule reservation.

More specifically, the present invention is concerned with a recording/reproducing system and its method, which may support the reproduction and watching operations of a large number of automatically recorded videos, and in particular, to a recording/reproducing system, which permits the facilitation of selection and management of recorded videos in the manner of following the operations of general AV equipment such as televisions and video decks.

2. Description of the Related Art

The development of digital techniques is making it possible to store a mass of AV data composed of video data and audio data without degradation. Recently, as HDD having a capacity of several ten GB or more is available at relatively low cost, HDD-based recorders are coming on to the market as well (Refer to reports of "Apparatuses to record television programs into HDD are coming out one after another (by Nikkei Electronics, No. 727, pp. 27 to 28, 1998) and "HDD-based digital recording techniques for domestic use come out at last" (by Nikkei Electronics No. 727, pp. 41 to 46, 1998)). With the increasing capacity of recording media, recording of more programs is made possible in a program recording/reproducing apparatus.

The HDD is a device, which is random-accessible to data recorded therein. Thus, the HDD may start reproduction directly from a user's favorite program without the need for reproducing the recorded programs from the top in sequence, dissimilarly to conventional reproduction of recorded contents in video tapes.

However, the more the number of recorded programs increases with the increasing capacity of the recording media, the more difficult it becomes to select a desired program to reproduce. In particular, a system configured to permit program recording and recording schedule reservation automatically on the basis of user's tastes and profile information shows a tendency to record programs more than the need, for a purpose of preventing a user from being disappointed with insufficient recording. For that reason, an excessive workload is required more and more for the user to select the desired program to reproduce.

In the environment of the above recording/reproducing system when in use, the permissible amount of time for the user to practically watch videos recorded is considered to be negligible as compared with the total amount of time of the videos recorded. However, any effective technique or remedy to bridge a gap therebetween has not been developed yet.

For instance, there is provided a method of displaying a list of names, channels and broadcasting dates or the like of recorded programs on a screen. However, it doesn't always follow that the user may grasp the program contents through such a display screen. Further, an attempt to display detailed information of each program also on the above display screen brings about a complication of images displayed on the screen, so that it becomes extremely difficult for the user to view the images on the screen.

A viewer, that is, the user does not always watch a specific television program on the air carefully. That is, the user generally assumes the style of watching television programs in such a way as to watch television for no purpose or as it happened that television is on. On the other hand, an action required for the user to watch one's desired recorded program after passing judgment one after another on which is the recorded program desired to watch is not fitted for the latter watching style. In other words, the above action permits no bridging of the gap between the total amount of time of videos recorded and the permissible amount of time for the user to practically watch the videos recorded.

Most users also have an inclination to fall into such a state of mind as attaining one's feeling of achievement or security with satisfaction of seeing recording of a specific broadcasting program finished, leading to one of causes that the users may not go so far as to bring watching of the recorded program into practice. For that reason, most recorded programs are apt to remain simply recorded, that is, be kept idle without a chance to be reproduced.

While the recording/reproducing system configured to permit the automation of recording and recording schedule reservation of broadcasting programs on the basis of the user's tastes and profile information has been available in the prior art, manual operations are required for the user oneself for reproduction and judgment on deletion or preservation of each recorded program, inclusively of their operations. There is also the need for individual display of a recording timetable, a list of recorded programs or the like, inclusively of its operation, every kind of information or operation, so that operational mistakes easily happen also in proportion as the work is complicated. To begin with, the operations in the recording/reproducing system described the above are incompatible with the passive watching style of the user in such a way as to view (or watch) on-the-air programs on television for no purpose.

If the user has no intention of watching the recorded programs, it means that storage of programs remaining simply recorded without being reproduced occurs so much. Consequently, as the recording capacity is approaching its limit, the user has to delete at least a part of recorded programs regardless of whether or not the user finished watching a target program for deletion. For instance, a function of a type which permits the automatic deletion of time-expired programs by means of setting the term of validity for preservation of programs has been available until now. However, much time is required for the user to set the term of validity serially every recorded program, and besides, it is difficult to set the appropriate term of validity. On the other hand, in the recording/reproducing system configured to set the term of validity, videos inclusive of important videos are in danger of deletion in user's unguarded moment and so on, so that it is extremely difficult to permit the above function to reflect on management of preservation of recorded videos while grasping the user's intention accurately. Accordingly, a function which permits the efficient deletion of only unnecessary videos from a mass of automatically stored recorded videos is in great demand.

To select target programs for deletion from a large number of recorded programs is considered to be indivisible from, that is, essentially the same as to select which program to watch.

On the other hand, in a recording/reproducing system of sequential access mode such as video tapes, even if the user gives a pause to a certain recorded program in the process of watching, disconnection of power or switching to other recorded programs to watch brings about a loss of information of a recorded program pause position. Thus, if the user desires to resume reproduction for watching from the last paused point, has the user stores a counter value for rewind operations or the like.

When a list of recorded programs is displayed on the screen in the recording date order, the user has to bring displaying of the list of recorded programs on the screen once into practice before selection of the desired program to reproduce. For that reason, if there is an interval of broadcasting/recording date between programs even having continuity like a series of programs inclusive of a serial drama or the like, when recorded, the complicated work is required for the user to watch such the programs in due order.

SUMMARY OF THE INVENTION

It is an object of the present invention to provide a recording/reproducing system, which is satisfactory to permit the automated recording and recording schedule reservation of videos of programs or the like sent on the air from broadcasting stations.

Another object of the present invention is to provide a recording/reproducing system, which is satisfactory to support the reproduction and watching operations of a large number of automatically recorded videos.

A further object of the present invention is to provide a recording/reproducing system, which is satisfactory to permit the facilitation of selection and management of recorded videos in the manner of following the operations of general AV equipment such as televisions and video decks.

A still further object of the present invention is to provide a recording/reproducing system, which is satisfactory to permit the reflection on management of preservation of recorded videos while grasping user's intention accurately.

The present invention is provided in view of the above objects, and a first aspect of the present invention relates to a system or a method of recording and reproducing broadcasting programs received or programmed to receive. The recording/reproducing system or method comprises a program sorting means or step of sorting broadcasting programs into categories according to a predetermined rule; a program recording means or step of recording the broadcasting programs or programming the recording thereof; a virtual channel management means or step of assigning virtual channels every category, while setting the broadcasting programs, sorted into the categories, in array on the associated virtual channel in the reproduction start order; a user operation means or step of accepting user-based channel select operations and/or program search operations on the virtual channels and a program presentation means or step of taking out the associated broadcasting program for reproduction from the selected channel in response to the user operations accepted through the user operation means or step.

An entry of the categories of virtual channels may be made according to user profiles and/or user instructions.

The virtual channels may include a virtual channel for an array of programs, which are not included in any category for the failure to set the associated category by the user.

The program sorting means or step may also be configured to sort the broadcasting programs according to EPG (Electronic Programming Guide) distributed as a part of data for data broadcast or instructions supplied from each user.

The virtual channels may be configured to determine the reproduction start order of programs in accordance with a priority established on the basis of at least one of the on-the-air program order, the user profiles and the user instructions.

The virtual channel management means or step may also be configured to shift reproduction start positions on the virtual channels in the process of being selected and non-selected with the lapse of real time. Thus, since the active operations or watching pose are not required for the user to reproduce the recorded videos, the above configuration is easily acceptable to the user having a passive watching style and besides, permits reduction in number of simply recorded programs kept idle without a chance to be reproduced.

The user operation means or step may also be configured to accept program search operations such as pause, fast forward and rewind of a reproduction position on each virtual channel, or in addition, operations of specifying the preservative status of recorded programs, inclusively of deletion, preservation and reservation (for later watching) relating to specific programs on the virtual channels. In particular, the "fast forward" and "rewind" operations across a plurality of programs reproduced on the same virtual channel are also applicable.

The virtual channel management means or step may also be configured to manage the preservative status of programs set in array on the virtual channels.

The virtual channel management means or step may also be configured to identify each program set in array on the virtual channels as one watched by the user or not.

The virtual channel management means or step may also be configured to locate programs on the virtual channels according to the specified preservative status with respect to each recorded program.

For instance, a program identified as one watched may be located in a period of the near past on a time base on the associated virtual channel, a program identified as one programmed to delete may be located in a period of the remote past on the time base, and a program identified as one preserved may be located in a period of the slightly remote past on the time base.

The virtual channel management means or step may also be configured to locate a program, identified as one programmed to be recorded, in a period of the future on the time base (provided that a point on and after a broadcasting date is required) on the associated virtual channel, permitting the presentation of information to the effect that how later the user is allowed to reproduce the associated program. A plurality of programs, if desired to record in the same time period or overlapped in point of time with a program programmed to be reproduced earlier than the associated program, may be located on the virtual channels without an overlap in the manner of shifting these programs to a point on and after the broadcasting date.

The virtual channel management means or step may also be configured to locate a program, identified as one remaining recorded without being watched (reproduced) yet, in a period of the future spare time on the associated virtual channel.

The virtual channel management means or step may also be configured to locate a program, identified as one reserved, in a period of the future spare time on the associated virtual channel preferentially, or alternatively locate the programs on the virtual channels for reproduction in the manner of specifying "a reservation period" for sorting the programs into periods of "near future" and "remote future" or the like, for instance, according to the reservation period.

The virtual channel management means or step may also be configured to locate the already set programs in overlapped array when the period of the future spare time is not filled with the recorded programs resulting from scheduling thereof, thus avoiding the absence of broadcasting programs (that is, programs for reproduction) on the virtual channels.

The virtual channel management means or step may also be configured to display a list of program schedules on each virtual channel and watching and preservative status of each program in the form of being identified at a glance. For instance, display of a program list is also practicable according to the watching or preservative status or in the manner of varying color, symbol and font or the like every channel.

The virtual channel management means or step may also be configured to locate a so-called series of programs in ascending order of recording dates serially on the same virtual channel. The array of programs as described the above may be scheduled on the basis of program identification information and data contained in EPG.

The virtual channel management means or step may also be configured to shift the reproduction start position on the virtual channel, which is in the process of being selected, to the period of the future or past on the time base in response to the "fast forward" or "rewind" instructions supplied through the user operation means or step. In such a case, instructions to permit no operation of "fast forward" to the program corresponding to one earlier than a scheduled date of broadcasting are also applicable. Further, the reproduction start position on the virtual channel in the process of being non-selected may be set to follow the lapse of real time, while the reproduction start position on the virtual channel in the process of being selected is shifted to the period of the future or past on the time base in response to the "fast forward" or "rewind" instructions supplied through the user operation means or step (that is, on the program list, only a line of the virtual channel in the process of being selected is set to slide in response to the "fast forward" or "rewind" operation, while no slide of other virtual channel lines occurs.)

The recording/reproducing system or method according to the present invention may further comprise a real channel management means or step of assigning real channels to the on-the-air broadcasting programs. In such a case, the program presentation means or step may also be configured to take out the recorded program for reproduction from the virtual channel, selected through the user operation means or step, in response to the selection of the above virtual channel, while presenting the on-the-air program on the real channel, selected through the user operation means or step, in response to the selection of the above real channel. The user operation means or step may also be configured to accept the channel select operations requiring no distinction between the real channels and the virtual channels.

The recording/reproducing system or method according to the present invention may further comprise a "To Watch list" management means or step of managing reproduction information or the like relating to paused programs on each virtual channel. The "To Watch list" management means or step may also be configured to start reproduction of the associated recorded programs in response to user selection in the manner of displaying a list of paused programs to accept user selection on the display of paused programs. The "To Watch list" may be placed in a non-volatile hold state for the duration of disconnection of power from the system and may also be set to permit deletion of a specific entry from the "To Watch list" according to the explicit instructions from the user.

According to the present invention, the recorded videos are sorted into categories, while the virtual channels are assigned to the categories. Since only the programs fitted for a certain specific category may be recorded onto the virtual channels, if configured according to the categories defined by the user, the user oneself may estimate quite accurately what kind or content of programs is included in which channel. Further, when there is the need for sharing the recording/reproducing system among a plurality of users for domestic use or the like, the virtual channels may be assigned every user.

The recorded programs are set in array on the time base on each virtual channel, permitting concurrent reproduction on each virtual channel. Provided that the virtual channels having no chance to bring watching into practice by the user are good enough to advance the reproduction start point on the occasion of channel selection with the lapse of real time, without the need for activating the process of reproducing the recorded program programmed to be reproduced at the pertinent time. Further, the above virtual channels are also good enough to calculate the reproduction start point on the occasion of channel selection, without the need for calculation point by point. The user may happen to watch various recorded programs only through the operation of switching over the channels from one to another or continuing to reproduce the recorded programs on a single channel after application of power at any time. It is to be understood that a quite passive style is sufficient for the user to watch the recorded programs.

The recording/reproducing system or method according to the present invention permits the user to watch the recorded program only through the channel switching operations, i.e., operations quite familiar to general television receivers. That is, it is not necessary for the user to learn a new operating method other than the channel switching operations, and besides, any active operation or watching pose is not required for the user to reproduce the recorded videos. Thus, the recording/reproducing system or method of the present invention is easily acceptable to the user having the passive watching style and also permits a reduction in number of simple recorded programs kept idle without a chance to be reproduced.

The present invention is applicable to a recording/reproducing system, which permits the automatic recording of videos of broadcasting programs or the like onto a high-speed random-accessible recording media such as a hard disk device.

The recording/reproducing system according to the present invention may present recorded videos to the user effectively and simply, permitting the user to watch one's desired videos efficiently.

The recording/reproducing system according to the present invention also permits the selection and other management of recorded videos by intuition in combination with well-experienced operations, which are familiar to the user, of AV equipment such as televisions and video decks (inclusive of operations of channel switching, fast forward, rewind and playback from the top and so on).

BRIEF DESCRIPTION OF THE DRAWINGS

The foregoing and other objects and features of the invention will become apparent from the following description of preferred embodiments of the invention with reference to the accompanying drawings, in which:

FIG. 16 is a view showing components of Scheduling Unit;

FIG. 17 is a view showing components of Play Unit;

FIG. 18 is a view showing the configuration of program information "TVContent";

FIG. 21 is a view showing "To Watch Entry" components added to a "To Watch List"

DETAILED DESCRIPTION OF PREFERRED EMBODIMENTS

Figure 1:
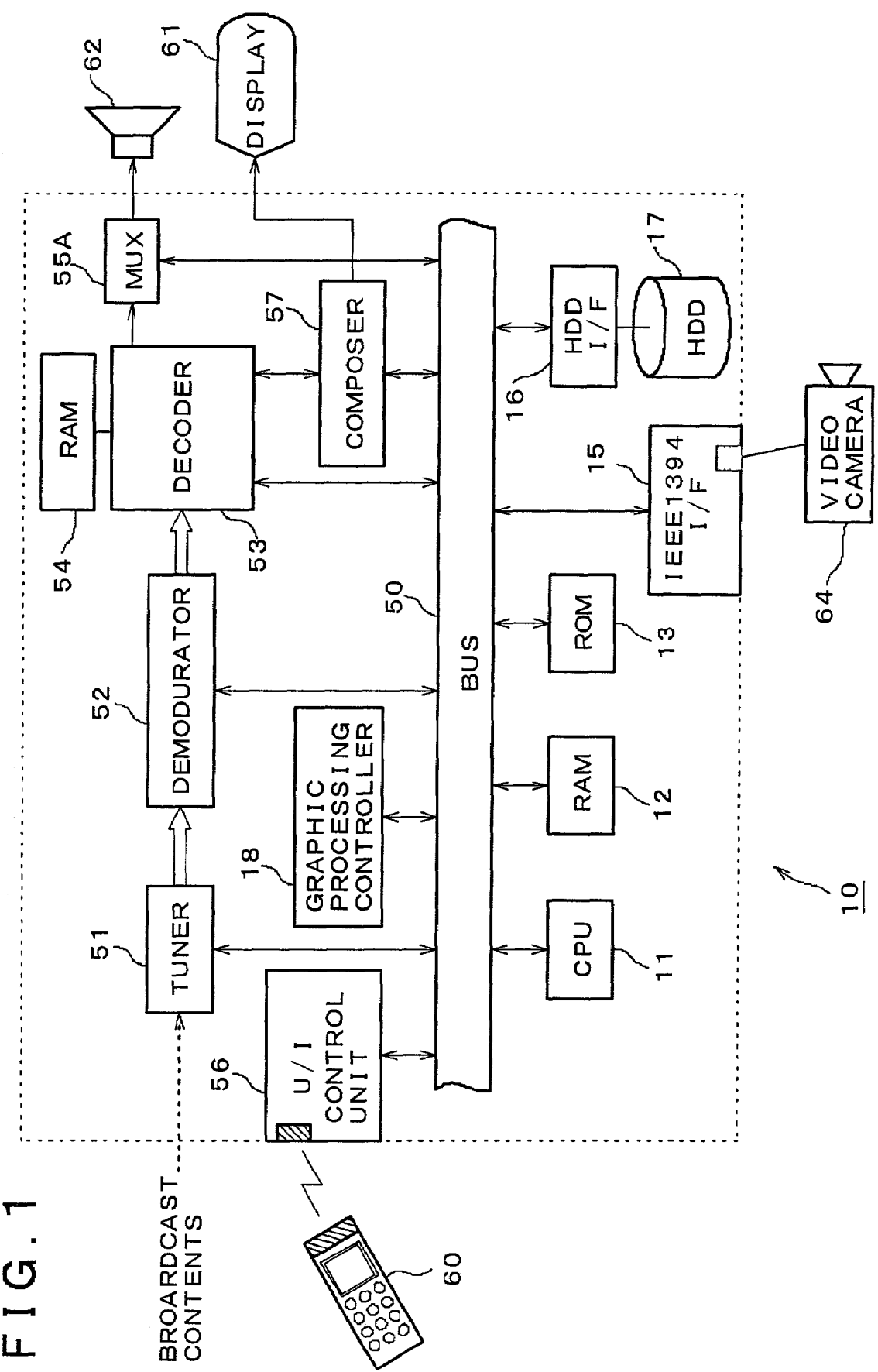
FIG. 1 schematically illustrates the hardware configuration of a recording/reproducing system 10 according to an embodiment of the present invention.

FIG. 1 schematically illustrates the hardware configuration of a recording/reproducing system 10 according to an embodiment of the present invention.

The recording/reproducing system 10 according to the embodiment of the present invention provides services of retrieval and presentation of recorded contents for a user, in addition to services of recording of broadcasting programs (broadcast contents) sent on the air hourly from broadcasting stations. In particular, one of the features of the recording/reproducing system 10 is a mass storage capacity enough to permit the recording of numerous videos and also the reflection on management of preservation of recorded videos while grasping user's intention accurately (which will be described later). The recording/reproducing system 10 may be packaged as AV equipment in such a way as to be integrated with a television receiver such as STB (Set Top Box), for instance.

The recording/reproducing system 10 comprises a CPU (Central Processing Unit) 11 as a main controller connected to each hardware component through a bus 50 for execution of overall control of the components. A description will now be given of each component of the recording/reproducing system 10.

A broadcast wave received by an antenna (not shown) is supplied to a tuner 51. The broadcast wave conforms to a predetermined format and may include program guide information (EPG: Electric Program Guide) or the like, for instance. It doesn't matter particularly whether the broadcast wave is referred to ground or satellite wave and is for wire or radio broadcasting service.

The tuner 51 outputs reception data to a succeeding demodulator 52 after tuning, that is, channel selection of the broadcast wave of a predetermined channel according to the instructions from the CPU 11. The demodulator 52 demodulates digitally modulated reception data. Incidentally, the configuration of the tuner 51 may be altered or extended appropriately depending on whether transmitted broadcast wave is referred to analog or digital broadcast wave.

In a case of digital satellite broadcasting service, for instance, digital data received and demodulated from the broadcast wave is considered to be "transport stream" configured by multiplexing AV data compressed in a mode of MPEG2 (Moving Picture Experts Group 2) and data for data broadcast together. The AV data in the former is referred to video and audio information configuring a broadcast content body. On the other hand, the data for data broadcast in the latter is referred to data annexed to the broadcast content body and includes EPG (Electric Program Guide), for instance. Incidentally, the transport stream is regulated with "transport layer" referred to in an OSI (Open Systems Interconnection) reference model.

A decoder 53 separates the transport stream into AV data compressed in the mode of MPEG2 and data for data broadcast after interpretation of the transport stream and further separates real-time AV data compressed in the mode of MPEG2 into compressed video data and compressed audio data. Then, the decoder 53 expands the video data in the mode of MPEG2 to reproduce an original video signal, while combining the audio data with additional sound after PCM (Pulse Code Modulation) decoding of the audio data to provide a reproduced audio signal. The decoder 53 may include a memory 54 for storage of work data as its own local memory. The reproduced video signal is outputted from the decoder to a display 61 through a composer 57. On the other hand, the reproduced audio signal is outputted from the decoder to a speaker 62 through a mixer 55.

The decoder 53 transfers the data for data broadcast, separated from the transport stream, to the CPU 11 via the bus 50. The CPU 11 conducts the processing of the data for data broadcast according to predetermined application, and the resultant data may be applied to creation of an EPG screen or the like.

The decoder 53 may also transfer MPEG2 stream before being subjected to expansion to the CPU 11 or other equipment (HDD 17 or the like, for instance) via the bus 50 in response to a request from the CPU 11.

A user interface control unit 56 is referred to a module for processing user input operations and has functions of accepting remote operations from a remote controller 60 through a manual-operation button/switch (not shown) operated directly by the user and infrared radiation (IR) or the like. The user interface control unit 56 may also include a display panel and an LED indicator (not shown) for displaying current set-contents.

The CPU 11 is referred to a main controller for generalizing the whole operations of the content recording/reproducing system 10 and permits the execution of various applications on a platform provided by OS (Operating System).

RAM (Random Access Memory) 12 is a write-enable volatile memory used for loading of execution program codes of the CPU 11 or writing of work data of an execution program. ROM (Read Only Memory) 13 is a read-only memory for storing permanently a self-diagnostic/initialization program required in application of power to the content recording/reproducing system 10, together with control codes for hardware operations or the like.

IEEE1394 (i-Link) interface 15 is referred to a serial high-speed interface, which permits the interchange of data of about several ten MBps. External equipment associated with IEEE1394 may be connected in a daisy chain or in a tree to an IEEE1394 port. The equipment associated with IEEE1394 may include a video camera 64, a video deck and a scanner (not shown) or the like, for instance.

The HDD (Hard Disk Device) 17 is referred to a random-accessible external storage device, which permits the storage of programs and data or the like in a predetermined file format and has a capacity as large as about several ten GB (or 100 GB or more), for instance. A hard disk storage space is managed by the operating system, for instance. The HDD 17 is connected to the bus 50 through a hard disk interface 16. In the embodiment of the present invention, the HDD 17 is used as a recording area of the broadcast contents and is also applicable to storage of information such as a user profile and a timetable. Although such a large-capacity external storage device is not limited to the hard disk device, it is more preferable for implementation of the present invention to use a hard disk device which is random-accessible.

The CPU 11 permits the execution of various applications under control of the OS (Operation System). The CPU 11 issues instructions to record or reproduce contents in response to user commands supplied through the remote controller 60 and the user interface (U/I) control unit 56, for instance (or may perform the recording operations at all times irrespectively of the presence or absence of explicit user commands).

In recording operations, the MPEG2 stream before being subjected to expansion is transferred from the decoder 53 to the HDD 17 according to the instructions from the CPU 11. A data transfer mode is not particularly limited and PIO (Program IO), DMA (Direct Memory Access) or like may be employed. Each broadcast content is stored in the HDD 17 in time series every virtual channel. Incidentally, how to store the contents will be described later.

In reproducing the recorded contents, the MPEG2 stream taken out from the HDD 17 is transferred to the decoder 53 through the bus 50 according to the instructions from the CPU 11. Similarly to the processing in reception, the decoder 53 separates the MPEG2 stream into the compressed video data and the compressed audio data, which are then restored to original video and audio data through MPEG2 expansion for reproduction.

The following processing is required for the CPU 11, in addition to issuance of instructions to record and reproduce the broadcast contents.

(1) Analysis and Management of User Profile

To store the user profile supplied through an operation panel (or a keyboard) or the user profile read from a recording media such as FD and CD, or to analyze the user profile such as user's hobbies and tastes for successive updating on the basis of a history of channel operations, for instance.

(2) EPG Analysis

To take out the EPG (Electronic Program Guide) contained in the data for data broadcast distributed together with the broadcast contents in the digital satellite broadcasting service, for instance, and to analyze the EPG.

(3) Program Scheduling

To make a schedule for recording and reproduction suited for the user on the basis of the user profile, the result of EPG analysis and time information. The schedule thus obtained is stored in the HDD 17 as a timetable in the recording/reproducing system 10 according to the embodiment of the present invention.

A graphic processing controller 18 is referred to a controller dedicated to generation of a computer screen according to graphic commands issued from the CPU 11 and has a graphic performance equivalent to SVGA (Super Video Graphic Array) or XGA (Extended Graphic Array), for instance. The graphic processing controller 18 generates a GUI (Graphical User Interface) operation screen and an EPG screen, for instance.

The composite processing is performed by the composer 57 for superposition of a reproduced video, restored by the decoder 53 through MPEG2 expansion, with a computer image, generated by the graphic processing controller 18, if needed.

In the recording/reproducing system 10 according to the embodiment of the present invention, the recorded videos are sorted into categories, and "virtual channels" are assigned to the categories. The categories referred to in this embodiment are determined by genre of the program contents such as "News", "Sports & Leisure" and "Drama & Documentary", for instance. The contents are set in array on a real or virtual time base on each virtual channel. Thus, the recording/reproducing system 10, when sets each virtual channel is set in a direction of vertical line and the time base is set in a direction of horizontal line, makes it possible to assign each recorded content on a two-dimensional plane. In other words, addressing of positions in two directions, i.e., vertical and horizontal directions, makes it possible to specify desired recorded contents.

Figure 2:
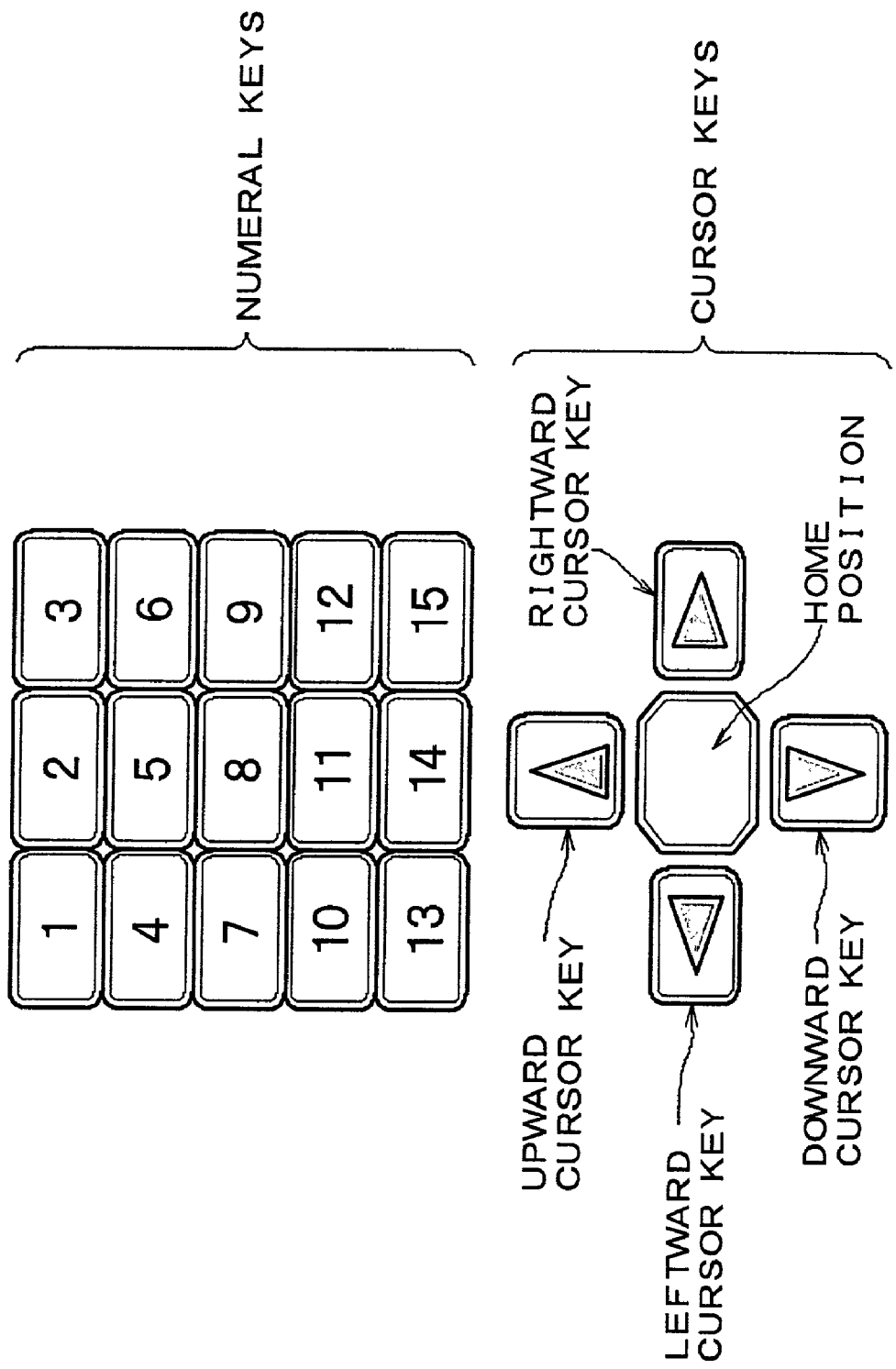
FIG. 2 is a view showing the configuration of a user operation panel of a remote controller 60 or a user interface (U/I) control unit 56 applied to the embodiment of the present invention.

FIG. 2 shows the configuration of a user operation panel of the remote controller 60 or the user interface (U/I) control unit 56 applied to the embodiment of the present invention.

As shown in FIG. 2, numeral keys assigned for select operations of channels are placed on the operation panel, together with cursor keys assigned for upward, downward, leftward and rightward cursor moves.

The channels assigned by the numeral keys may include virtual channels configured by the contents stored in the HDD 17, in addition to channels for broadcast programs sent on the air from the real broadcasting stations. Thus, the user may watch the programs in the virtual channels, that is, may give an instruction to reproduce the contents from the HDD 17 through the operations equivalent to the ordinary channel selection.

The numeral keys unavailable for the real broadcast channels are preferably assigned for virtual channel operations. 15 pieces of numeral keys 1 to 15 in total are used for the embodiment shown in FIG. 2. The channel numbers 13 to 15, if not assigned to the real channels representing the real broadcasting stations, for instance, are considered to be spare channel numbers, which may be applied to assignment to the virtual channels.

The cursor keys include upward, downward, leftward and rightward cursor keys, which are placed at upper, lower, left and right locations substantially about a central home position. Thus, the user, if puts the tip of finger on the home position in advance, may detect a desired-direction cursor key with the tip of finger for key operations without the need for watching the operation panel in particular (that is, without raising one's eyes from the TV screen).

In general, the upward or downward (+ or −) cursor key on a remote controller or a Set Top Box, when touched, permits the channel number to be incremented or decremented one by one for channel selection. On the assumption that the channel number 12 is selected in the content recording/reproducing system 10, for instance, every time the upward (+) cursor key is once touched, the successive transition of the channel occurs in the order of the channel numbers 13, 14 and 15. Touching one more the upward cursor key may restore the channel to the channel number 1.

The program contents on the virtual channels are recorded in a random-accessible device such as the HDD 17, permitting start of reproduction at a desired speed from a desired storage location. Thus, various watching modes such as "fast forward", "rewind", "slow motion" and "scene jump" are applicable to the virtual channels.

The operation panel having the upward, downward leftward and rightward cursor keys as shown in FIG. 2, when in use, permits the assignment of leftward and rightward cursor move operations to the time base. For instance, the leftward cursor key may be assigned for an access to a program right before the associated program in the virtual channel, while the rightward cursor key may be assigned for an access to a program right behind the associated program in the virtual channel. Further, touching each of these cursor keys longer (that is, continuing to touch each key for a predetermined period of time or more) may cause a jump largely forward or rearward.

Figure 3:
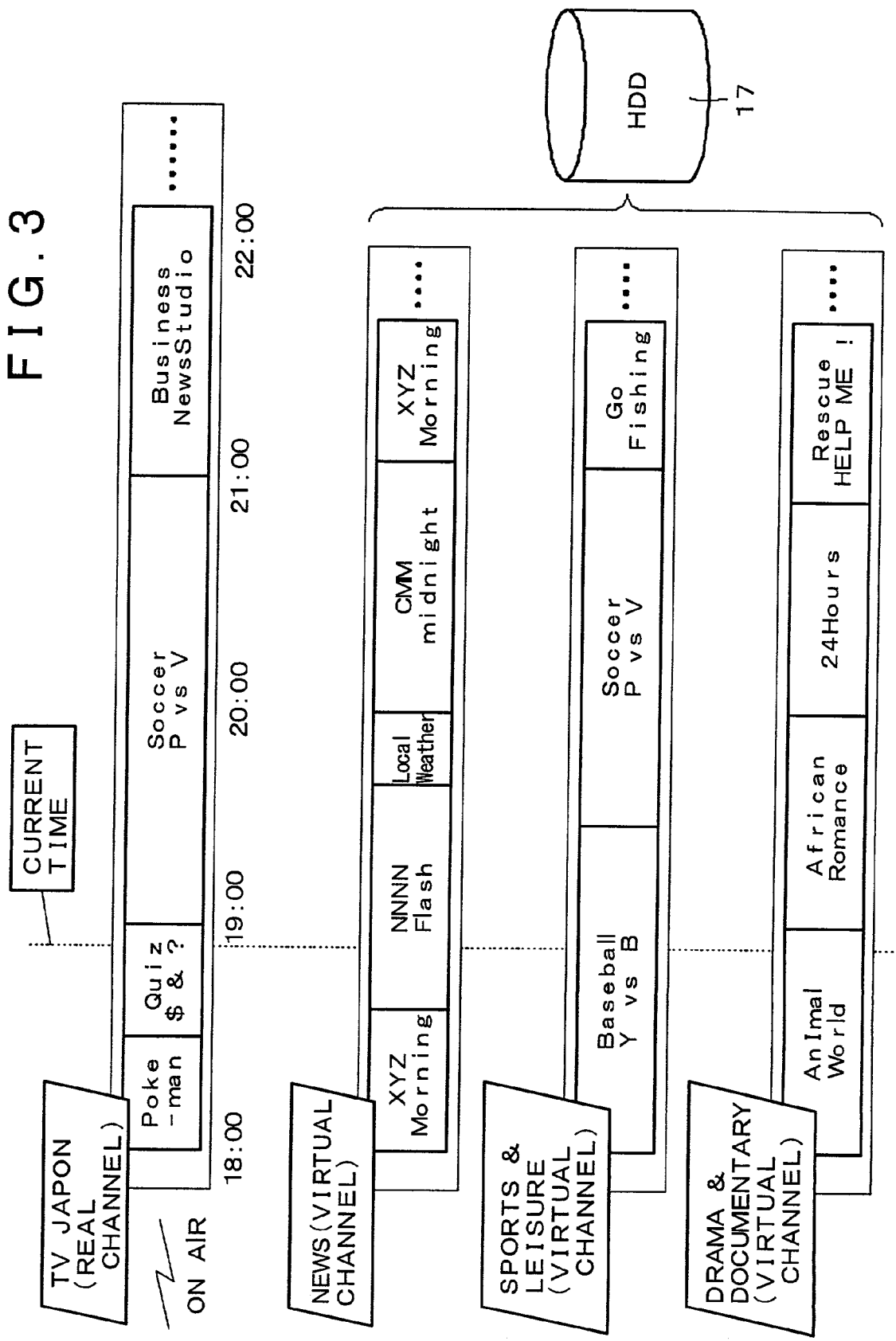
FIG. 3 schematically illustrates the configuration of a program table in the recording/reproducing system 10 according to the embodiment of the present invention.

FIG. 3 schematically illustrates the configuration of a program table in the recording/reproducing system 10 according to the embodiment of the present invention. In the embodiment shown in FIG. 3, each channel is assigned in a direction of vertical line, while the time base is assigned in a direction of horizontal line, and this program table assumes the shape of a kind of timetable.

Real channels for programs sent on the air practically and virtual channels set every category are assigned to the channels. In the embodiment shown in FIG. 3, "TV Japon" is shown as the real channel, while the virtual channels are assigned to categories such as "News", "Sports & Leisure" and "Drama & Documentary". Further, when there is the need for sharing the recording/reproducing system among a plurality of users for domestic use or the like, the virtual channels may be assigned every user.

An analysis of EPG distributed as the data for data broadcast, for instance, may be applied to edition of scheduling on the real channel. On the other hand, the recorded contents sorted into the associated categories are assigned in time-series, that is, in the reproduction start order for scheduling on the virtual channels. The recorded contents in each virtual channel are set in array in accordance with a priority established properly on the basis of the user profile or the like on the system 10.

The start and end times of the programs on the real channel are in conformity with instructions on the broadcasting station side. On the other hand, the start and end times of the programs on the virtual channels are not always necessary to conform to a breakpoint such as a period exactly every hour, quarter, half an hour and so on.

Figure 4:
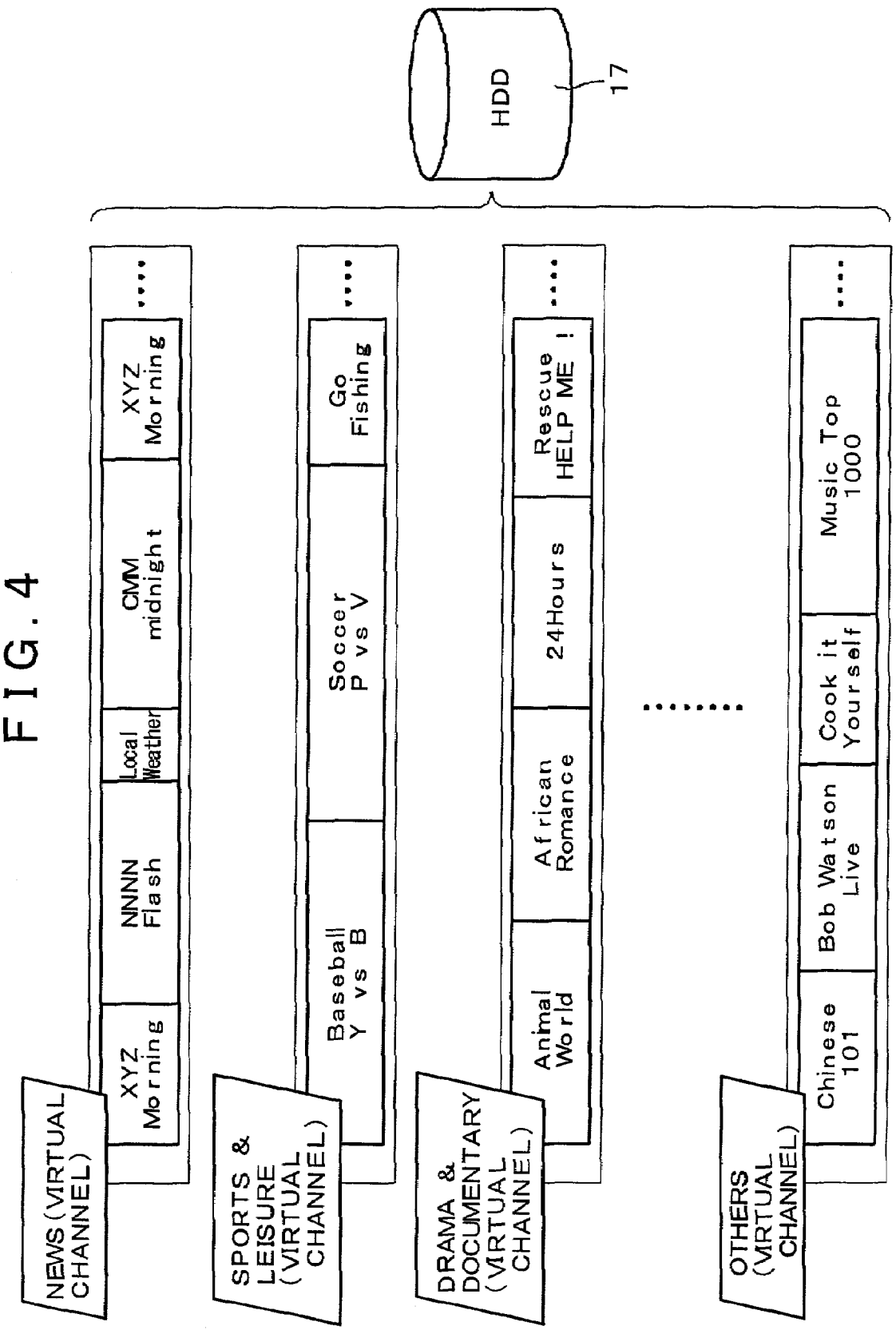
FIG. 4 is a view showing arrays of recorded contents on associated virtual channels assigned every category.

FIG. 4 shows arrays of recorded contents on the associated virtual channels assigned every category.

The categories may be set through user-based selection from a list of preliminarily defined categories (setting of a plurality of categories is applicable) or through automatic selection on the basis of the user profile. Otherwise, assignment of the virtual channels every user is also applicable.

A virtual channel "Others" at the final stage shown in FIG. 4 is for accommodation of programs which are not included in any category for the failure to set the associated category by the user.

Figure 5:
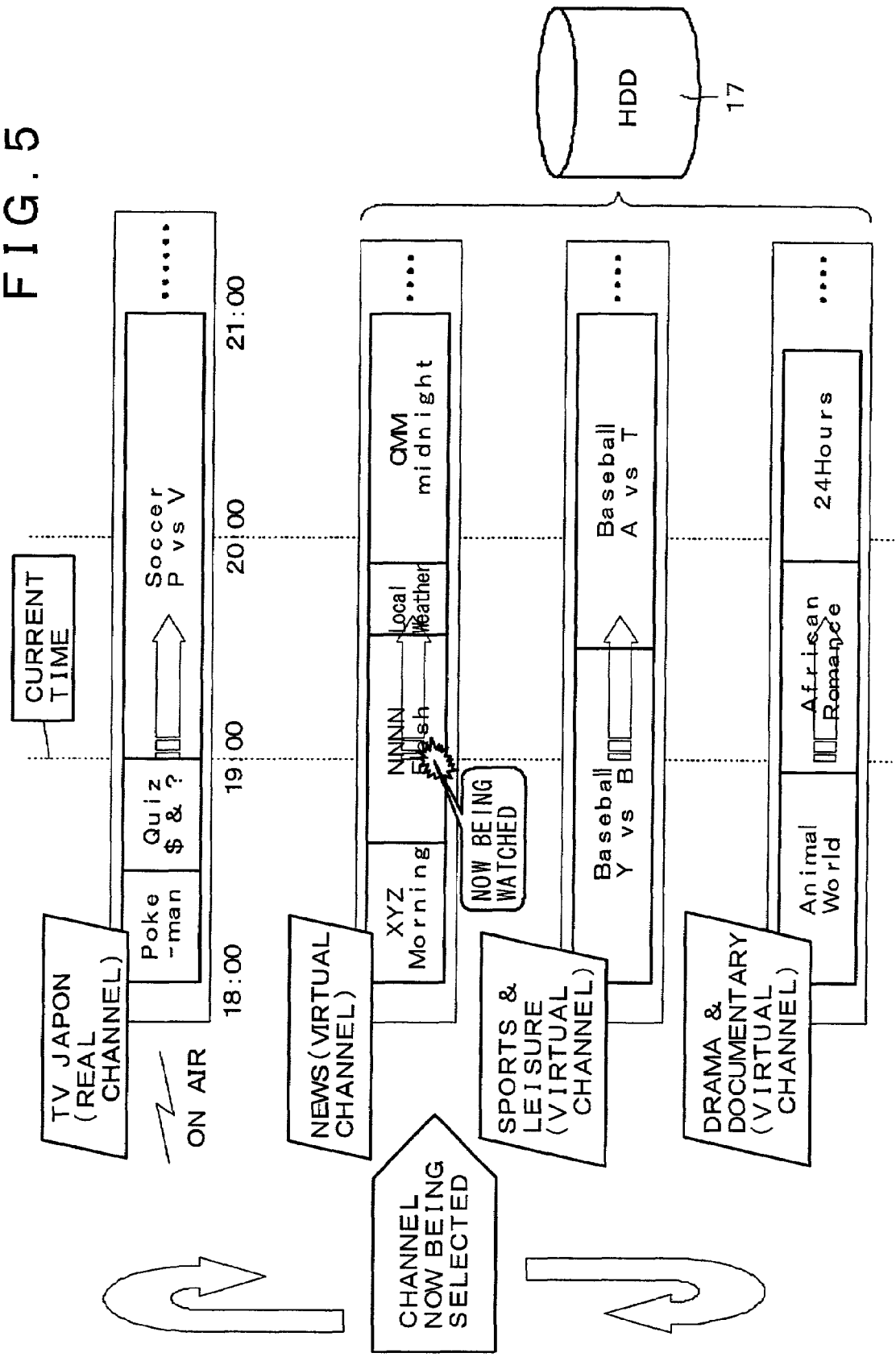
FIG. 5 is a view showing the channel switching operation required for a user on the program table shown in FIG. 3.

FIG. 5 depicts the channel switching operation required for the user on the timetable shown in FIG. 3. The channel switching operation may be made by touching the key of a desired channel number or the upward or downward cursor key on the operation panel shown in FIG. 2, for instance.

In the embodiment shown in FIG. 5, it is assumed that the viewer, that is, the user is placed in a situation of now watching a program titled "NNNN Flash" on the virtual channel assigned to the category of "News".

The user may watch the programs of different channels in sequence through the channel switching operation with the remote controller 60 or the like. While the channel at the uppermost stage in FIG. 5 represents the real channel called "TV Japon" now on the air, switching of the real channel to the virtual channels is practicable continuously without distinction between the real channel and the virtual channels. For instance, the downward cursor key of the remote controller 60, if continued to touch down, switches over the channels in the order of programs titled "NNNN Flash", "Baseball Y vs B", "Animal World" . . . and "Quiz $ & ?".

The time base is advancing independently on each virtual channel even for the period of time when the other channels are being selected. For instance, when the user switches over the real channel called "TV Japon" on the air to the other virtual channels after continuing to watch the program on the above real channel until the real time reaches 20:00, the programs titled "CNN midnight", "Baseball A vs T" and "24 hours" are in the process of being reproduced on the virtual channels.

The advance of time on the virtual channels is also applicable for the duration of not only application of power to the system 10 but also disconnection of power or standby. This may be by synchronization of a system clock with the schedule on a certain virtual channel when selected. (The virtual channels having no chance to bring watching into practice by the user are good enough to advance the reproduction start point on the occasion of channel selection with the lapse of real time without the need for activating a process of reproducing a recorded program programmed to be reproduced at the pertinent time. The above virtual channels are also good enough to calculate the reproduction start point on the occasion of channel selection, without the need for calculation point by point.)

A concept of the lapse of time on the virtual channels used for reproduction of the recorded contents, when introduced, is easily accepted to the user having a passive watching style and besides, permits a reduction in number of simply recorded programs kept idle without a chance to be reproduced.

The recorded videos to be reproduced on the virtual channels are stored in the high-speed random-accessible recording media such as the HDD, permitting an access to the desired reproduction start point at high speed through the fast forward or rewind operation. The fast forward or rewind operation is instructed by touching each of the leftward and rightward cursor keys on the operation panel shown in FIG. 2, for instance.

Figure 6:
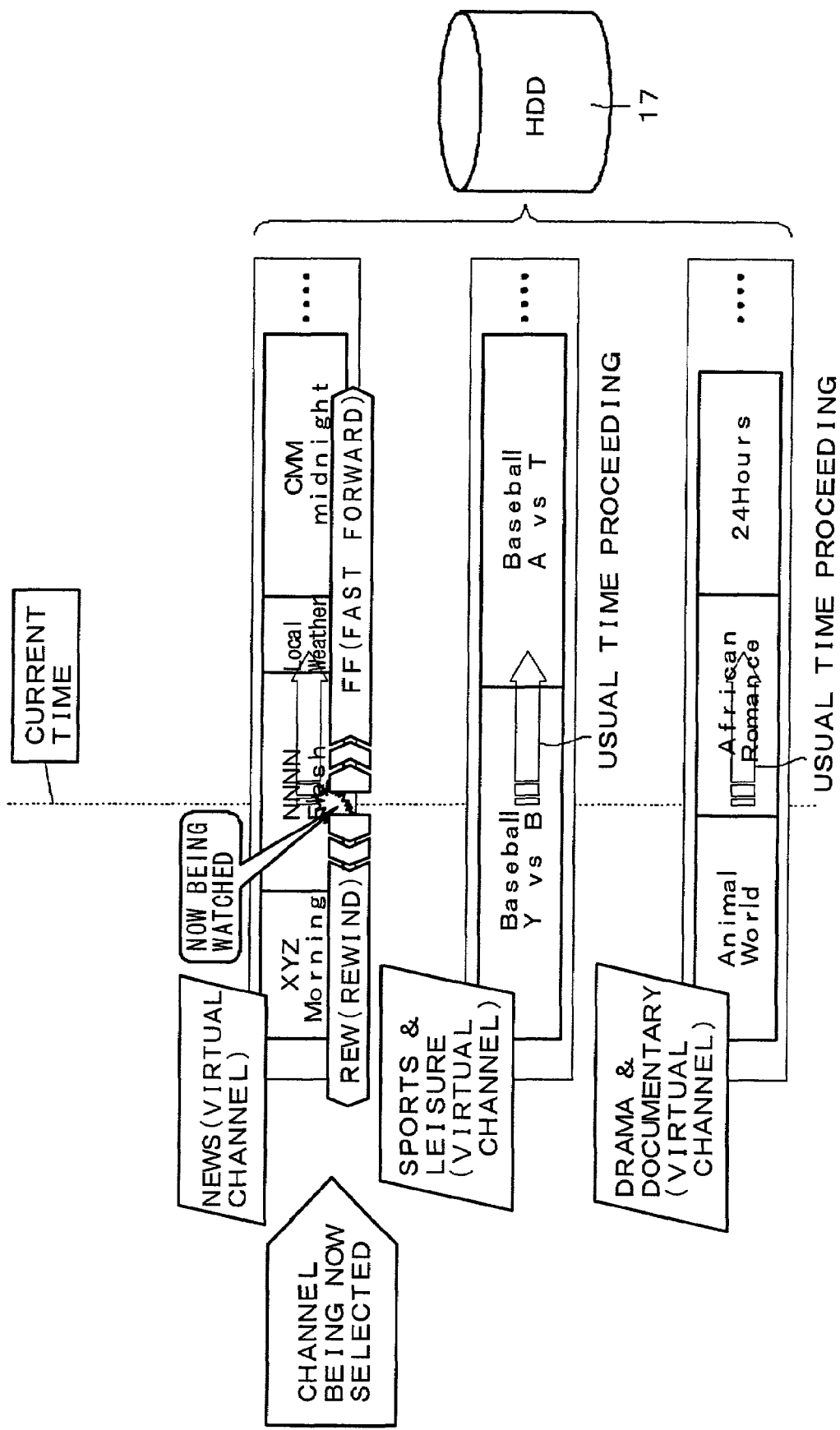
FIG. 6 is a view showing "fast forward" or "rewind" operation applied to a virtual channel, which is now in the process of reproduction, to permit a user to watch programs before and behind the associated program.

FIG. 6 shows the "fast forward" (FF) and "rewind" (RW) operations applied to a virtual channel, which is now in the process of reproduction, that is, in the process of being watched, to watch a program before and behind the associated program.

In the embodiment of the present invention, the "fast forward" and "rewind" operations applied to a certain virtual channel have no effect on the advance of time on the other virtual channels. For instance, as shown in FIG. 6, on the assumption that the virtual channel assigned to the category of "News" is being selected, the "fast forward" or "rewind" operation, if applied to the selected virtual channel, permits an access to the recorded program contents before and behind the associated program on the selected virtual channel, while no access of the recorded contents occurs on the other virtual channels. That is, "Baseball Y vs B" remains reproduced on the virtual channel assigned to the category of "Sports & Leisure", while "African Romance" remains reproduced on the virtual channel assigned to the category of "Drama & Documentary".

Figure 7:
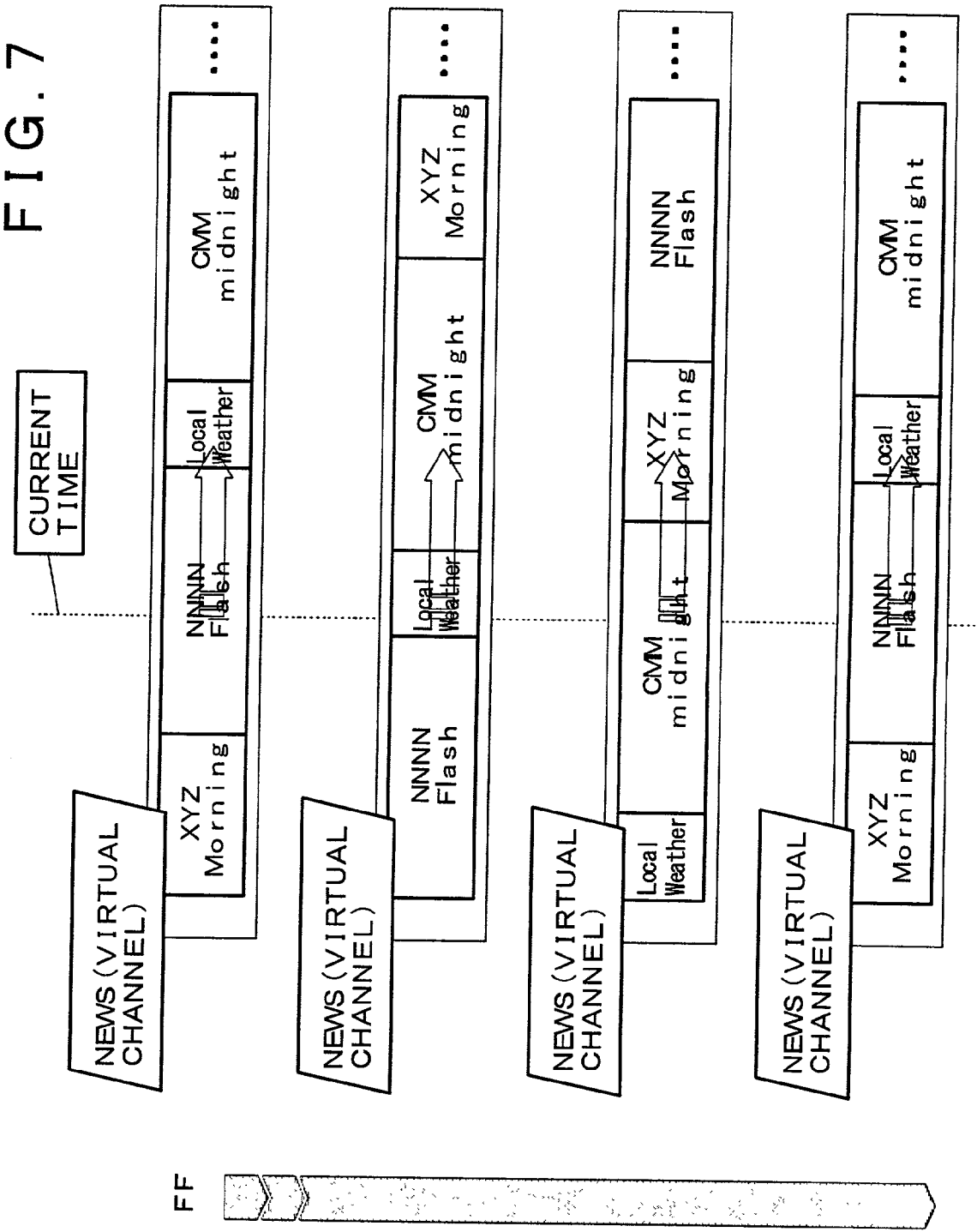
FIG. 7 is a view showing the "fast forward" operation in a certain specific virtual channel (News) for the duration of display of a screen for a list of scheduling of programs to reproduce.

FIG. 7 depicts the manner of the fast forward operation applied to a certain specific virtual channel assigned to the category of "News", while a list of scheduling of programs to reproduce is being displayed on the screen.

As shown in FIG. 7, it is understood easily visually that the time base (i.e., a reproduction schedule) is being advanced in the certain virtual channel through the "fast forward" operation for sliding the list of programs to the left. Provided that it is an important consideration that the above "fast forward" operation has no effect on the other virtual channels, to which no "fast forward" operation is applied, resulting in no advance of the time base. The same may be applied to the rewind operation.

Figure 8:
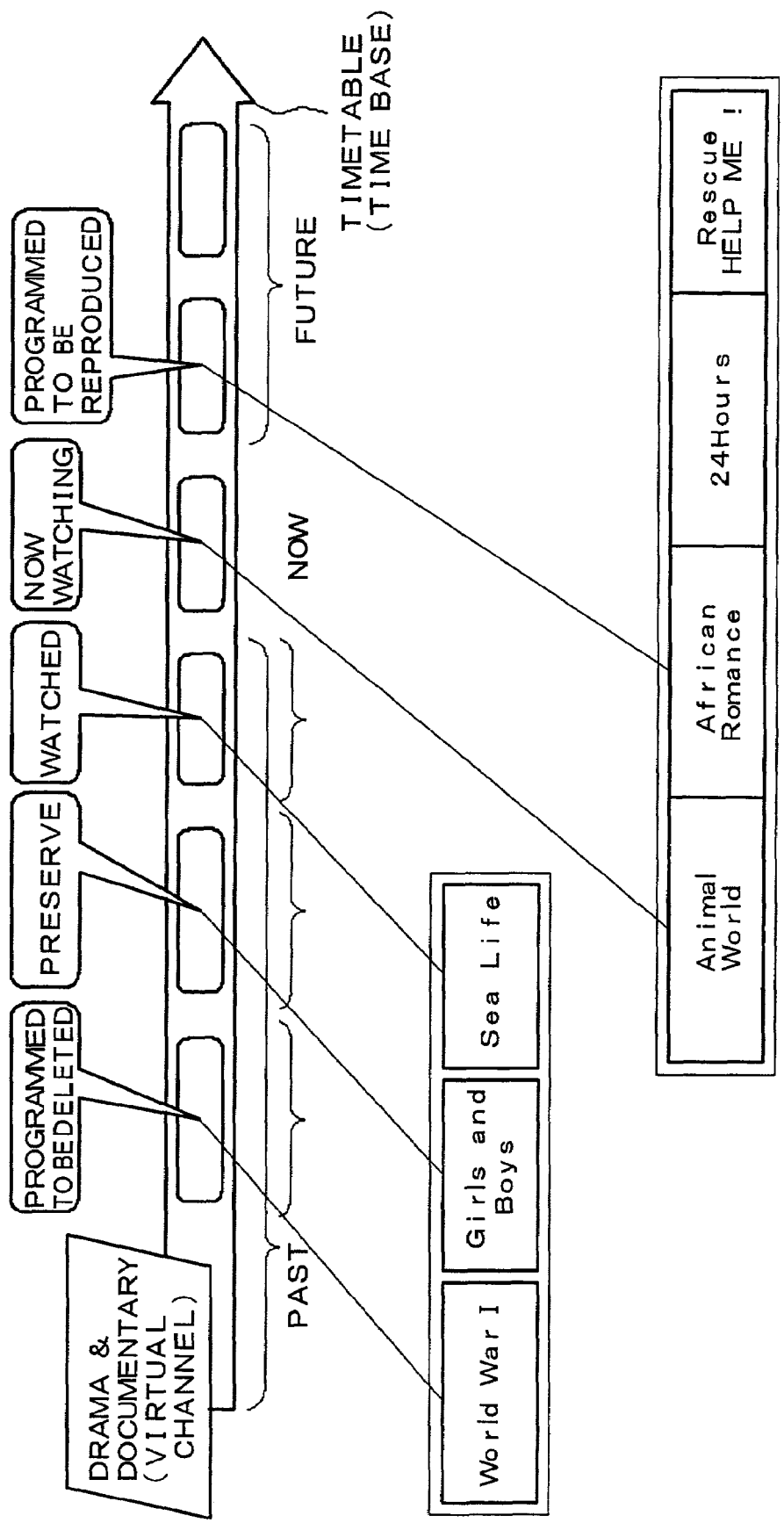
FIG. 8 is a view showing a timetable describing the array of programs, that is, the program reproduction order in a certain virtual channel.

FIG. 8 illustrates the timetable describing the array of programs, that is, the reproduction order of programs in a certain virtual channel assigned to the category of "Drama & Documentary".

As shown in FIG. 8, the timetable constitutes a time base composed of a current position "Now", a time period of "Past" on the left side of "Now" and a time period of "Future" on the right side of "Now".

In the time period of "Past", a program identified as one programmed to be deleted soon (i.e., "World War I in the embodiment shown) is located in a period of the remote past on the time base. Then, a preserved program (i.e., "Girls and Boys") and a program identified as one watched (i.e., "Sea Life") are located in this order.

In the timetable shown in FIG. 8, the reproduction times on the reproduction schedule are set in array in the order, which is from most to least past, on the reproduction schedule basically, permitting the user to search by intuition a desired program in the virtual channels in such a way as to require a slight rewind operation for searching a recently watched program and a more "rewind" operation for searching a more previously watched program.

On the other hand, programs identified as one programmed to be reproduced in future are located on the virtual channel in the time period of "Future" on the timetable according to the reproduction schedule order. In the embodiment shown in FIG. 8, the programs identified as one programmed to be reproduced in future are located in the order of "African Romance", "24 Hours" and "Rescue Help Me!".

Incidentally, the recorded programs located on the timetable may be sorted by color for display according to a difference from the time to reproduce. Thus, the status of programs to be reproduced may be identified at sight in such a way as to display a program, identified as one programmed to be deleted soon, dark (or light) or a program, identified as one programmed to be reproduced in future, bright or highlighted.

On the other hand, the real channel is referred to a channel for receiving the programs sent on the air from the real broadcasting station, and a plurality of real channels are considered to be available. Further, the contents of the programs sent on the air from the broadcasting station basically have no relation to assignment of the virtual channels on the recording/reproducing system 10, that is, the categories of the programs. Thus, it is often that two or more programs to be assigned to the same virtual channel would be sent on the air from different broadcasting stations, that is, in the same time period on the real channels.

Figure 9:
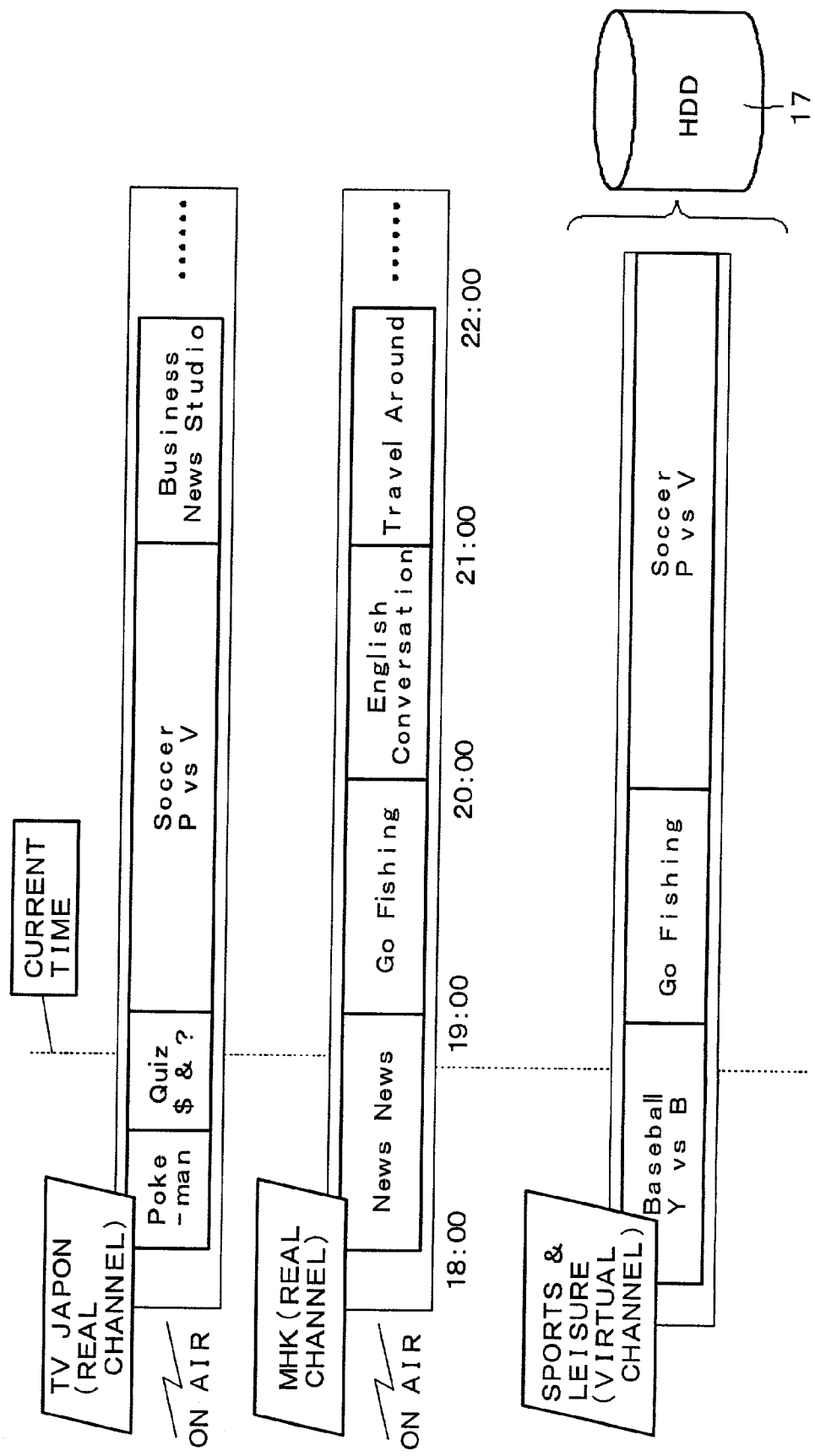
FIG. 9 is a view showing a virtual channel scheduling method, when applied to a case where a plurality of programs to be included in the same virtual channel are sent on the air in the same time period.

FIG. 9 shows a method of scheduling the programs on a certain virtual channel when a plurality of programs to be included in the same virtual channel is sent on the air in the same time period.

In the embodiment shown in FIG. 9, it is assumed that programs titled "Soccer P vs V" and "Go Fishing" to be included in the virtual channel assigned to the category of "Sports & Leisure" are on the air simultaneously from 19:00 on both the real channels of "TV Japon " and "MHK".

In this case, the recording/reproducing system 10, although starts recording of both the programs from 19:00, is configured to reproduce one program titled "Go Fishing" earlier in the virtual channel assigned to the category of "Sports & Leisure". In this place, if the end time of the last program titled "Baseball Y vs B" on the associated virtual channel is supposed to exceed 19:00, the reproduction start time of "Go Fishing" would be later to that extent. Then, the program titled "Succor P vs V" is set to start reproduction (or the reproduction start time is set) after the completion of reproduction of the program titled "Go Fishing".

Incidentally, when a plurality of programs to be included in the same virtual channel is on the air in the same time period, which program should be started to reproduce at first, that is, the program reproduction order may be set according to a default value or a priority established on the basis of the user profile.

Since the recorded videos to be reproduced on the virtual channels are stored in the high-speed random-accessible recording media such as the HDD 17, "pause" is also applicable, similarly to the "fast forward" and "rewind" operations. The recording/reproducing system 10 according to the embodiment of the present invention is configured to display a list of paused programs, that is, a "To Watch list" on the display 61 for providing user feedback.

Figure 10:
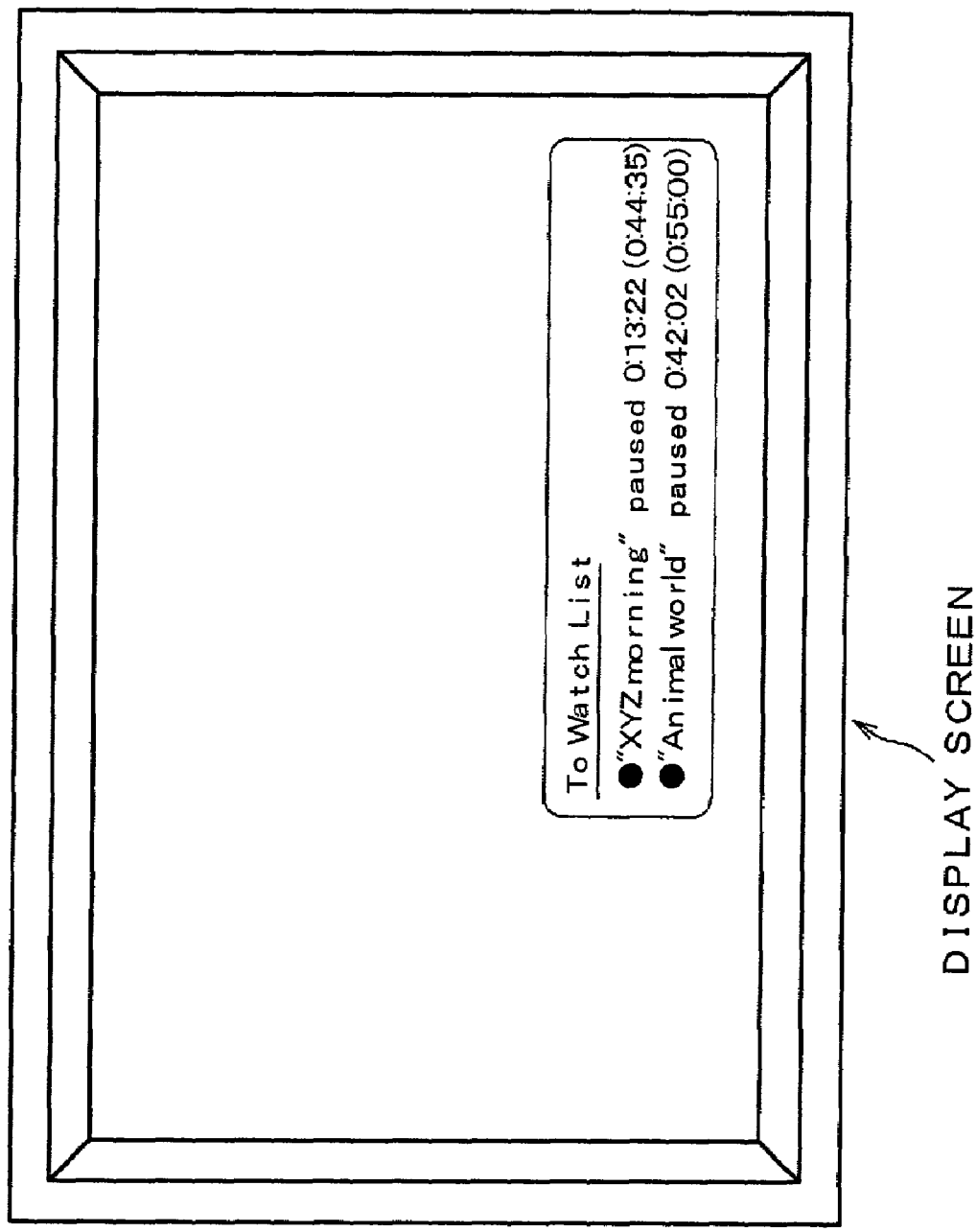
FIG. 10 is a view showing a "To Watch list" displayed on a display screen.

FIG. 10 shows the "To Watch list" displayed on the display screen. The "To Watch list" displayed in FIG. 10 represents that a program titled "XYZ morning" of a duration time of 44 minutes 35 seconds as a whole is now paused in a point 13 minutes 22 seconds past its forefront point, and also that a program titled "Animal World" of a duration time of 55 minutes as a whole is now paused in a point 42 minutes 02 seconds past its forefront point.

The user may resume reproduction in the manner of selecting any one of entries from the "To Watch list" to release the recorded program from its paused state. In this place, immediate reproduction is practicable irrespectively of how to schedule the programs in which virtual channel for reproduction at what time. In resuming the reproduction in this manner, schedules of the programs in any virtual channel remain unchanged.

The "To Watch list" may be implemented by operating a stop position of a program in each virtual channel in the CPU 11, then generating a display window in the graphic processing controller 18 and superposing the generated window image on the on-the-air or reproduced program videos for display in the composer 57.

The user may provide "Evaluation by user oneself" for a program, which is now being watched, through the operation panel of the remote controller 60 or the like. That is, buttons (or input means equivalent to the buttons) corresponding to "Delete", "Watched", "Preserve", "Reserve" and "Cancel of evaluation" are provided on the operation panel to permit the user to give instructions at all times. As a matter of course, the recording/reproducing system 10 may be configured to delete automatically a recorded program having no chance to bring watching into practice for a long time, (that is, kept idle) or identify a program reproduced abnormally for a certain period of time as one watched. Also, the user-based direct evaluation may be used in combination with the automatic evaluation based on the recording/reproducing system 10.

Figure 11:
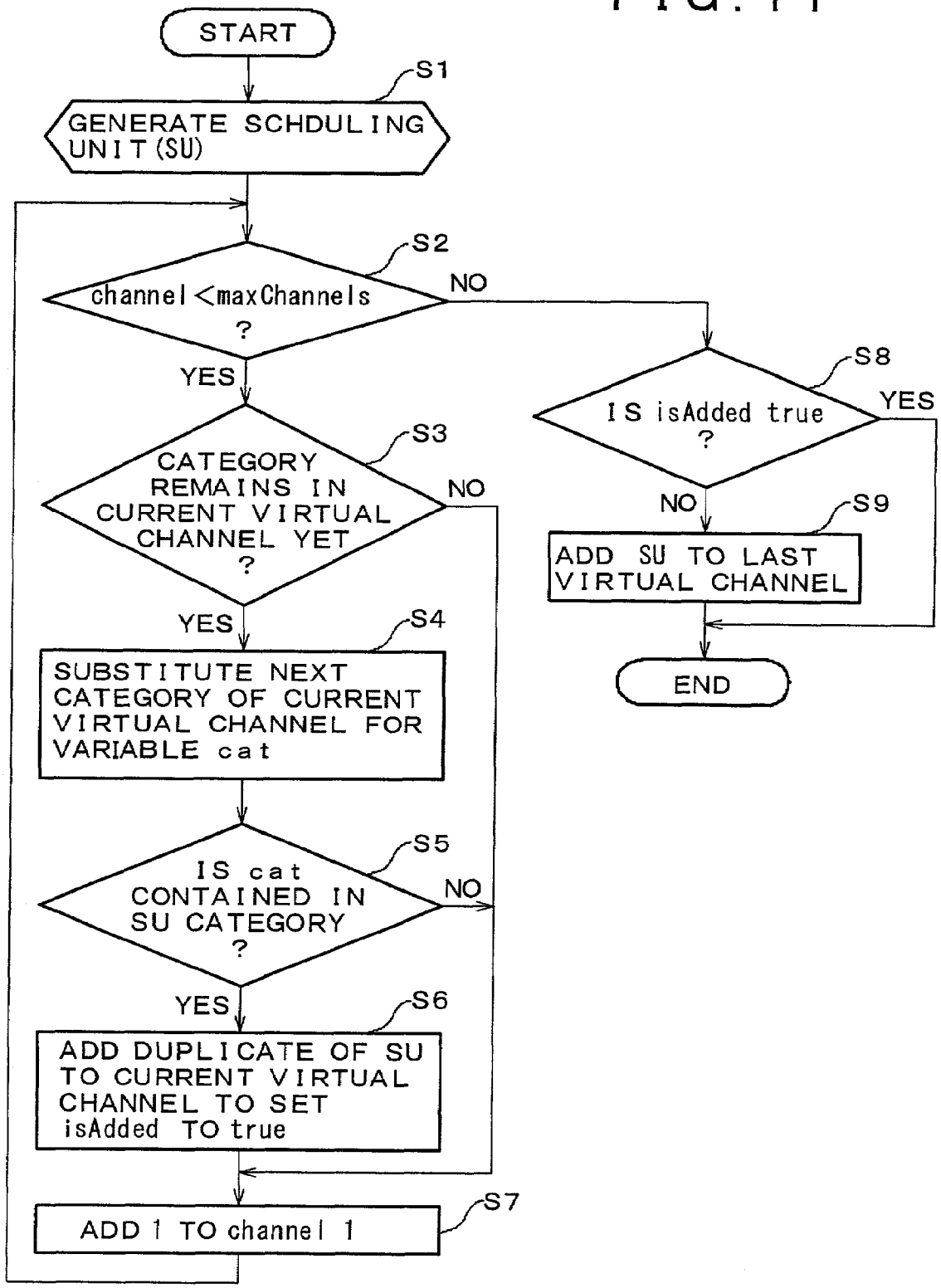
FIG. 11 is a flow chart showing a procedure of assigning program contents recorded through automatic or manual operations and program contents programmed to be recorded in the future to virtual channels according to the recording/reproducing system 10.

FIG. 11 shows a flow chart of the procedure of assigning the program contents recorded through the automatic or manual operations on the recording/reproducing system 10 and the program contents programmed to record in the future to the virtual channels. A description will now be given of the above procedure with reference to this flow chart.

Firstly, as set-up operations, data called "SU" (Scheduling Unit) serving as units of scheduling is created for programs (Step S1). The SU has components as shown in FIG. 16 and may be created on the basis of program information "TVcontent" as shown in FIG. 18 (which will be described later.). The procedure of generating "TVcontent" and the procedure of generating "Scheduling Unit" on the basis of "TVcontent" will be described later.

As another set-up operations, a variable "isAdded" is set to "false", and "channel" representing a current channel number is initialized to 1 to set the total number of virtual channels (six, for instance) for a variable "maxChannels".

Subsequently, the current channel number "channel" is compared with the variable "maxChannels" (Step S2). When the former is smaller than the latter, the processing is advanced to Step S3. On the other hand, when being larger, the processing is advanced to Step S8.

In Step S3, it is decided whether or not a category remains yet in the current virtual channel represented by "channel". When the result of decision is YES, the processing is advanced to Step S4. On the other hand, when the result of decision is NO, the processing is advanced to Step S7.

In Step S4, the next category of the virtual channel in the process of being now selected is substituted for a variable "cat". Then, in Step S5, it is decided whether or not "categories" of SU contains the variable "cat". When the result of decision is YES, the processing is advanced to Step S6. On the other hand, when the result of decision is NO, the processing is advanced to Step S7.

The variable "channel" is incremented by 1 in Step S7, before the processing is returned to Step S2 to repeat the similar processing to that described the above.

With the above processing, Steps S2 to S6 are supposed to be executed with respect to all the virtual channels except for the last virtual channel. At this point of time, it is decided whether or not the variable "isAdded" is true (Step S8). When the result of decision is YES, SU is considered to be added to any virtual channel, and therefore, the recording/reproducing system 10 brings the whole routine of the present processing to end.

On the other hand, when the variable "isAdded" is judged to be false, the processing is advanced to Step S9. Since it is ascertained that no SU is added to any virtual channels, addition of SU to the last (i.e., "maxChannel"-th) virtual channel is required in Step S9 before the system 10 brings the whole routine of the present processing to end. The last virtual channel is referred to a channel reserved by the system 10 for storing programs, which are not matched with any virtual channels assigned to the categories specified by the user.

Incidentally, after addition of SU to the virtual channel in Step S6, repetition of the processing in Steps S2 to S6 is required on and after the next virtual channel, so that the same SU often matches a plurality of virtual channels. The processing of creating "Duplicate of SU" for addition to the virtual channel in Step S6 is for treating SU (corresponding to the same program) added to the different virtual channels as independent SU.

Figure 12:
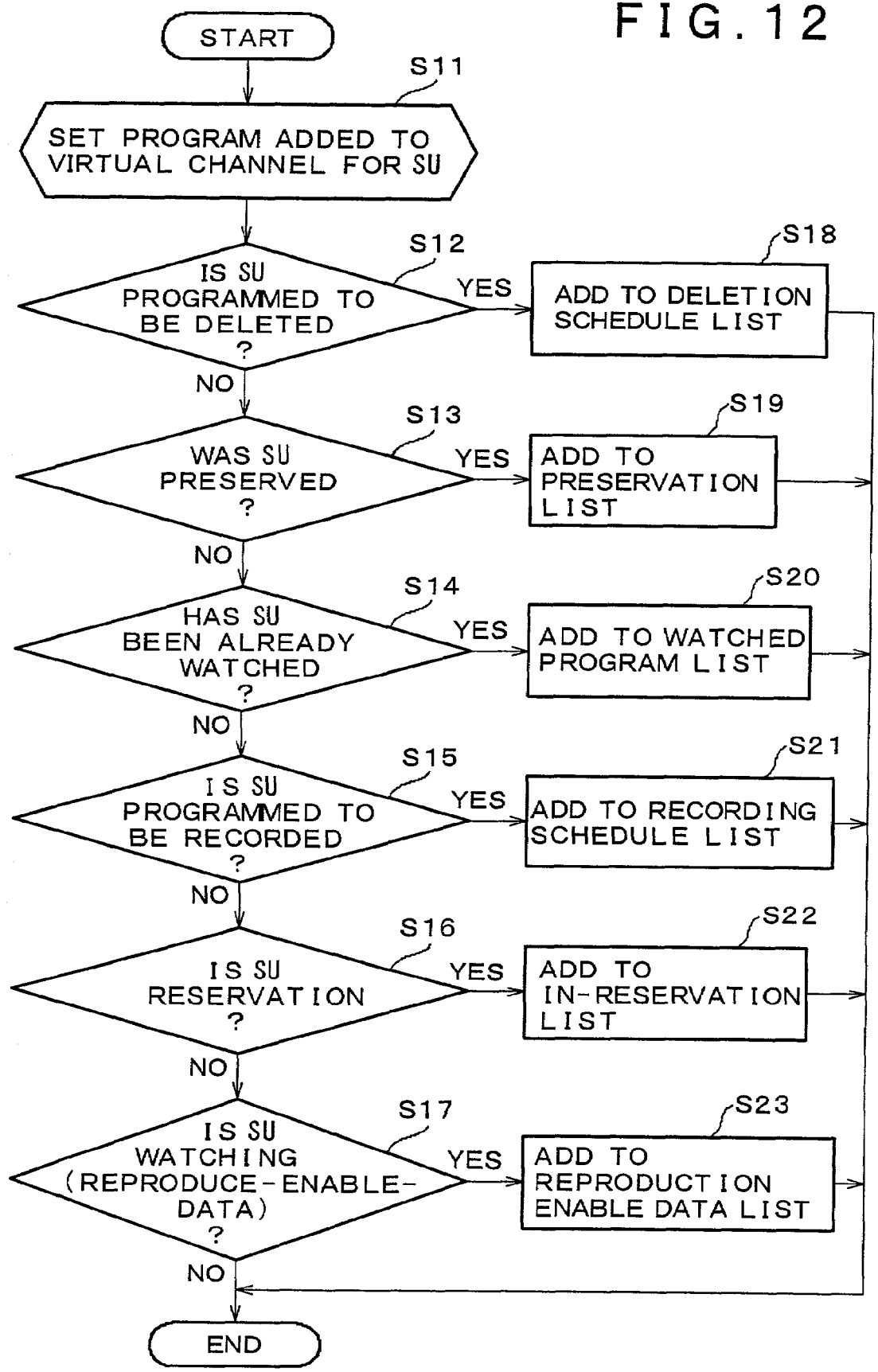
FIG. 12 is a flow chart showing a procedure of scheduling in each virtual channel.

The routine of processing shown in FIG. 11 makes it possible to determine the virtual channel including a certain recorded program (or a program identified as one programmed to be recorded). A description will now be given of the procedure of scheduling in each virtual channel with reference to the flow chart shown in FIG. 12.

As set-up operations, "scheduling Unit" of a program added to the associated virtual channel is set for the variable "SU" (Step S11).

In the following processing, addition of SU to the corresponding list is required successively on the basis of "Status" of "Scheduling Unit" (Refer to FIG. 16).

In Step S12, it is decided whether or not SU is programmed to be deleted. When the result of decision is YES, addition of SU to a deletion schedule list in ascending order is required (Step S18) before the system 10 brings the routine of the present processing to end.

In Step S13, it is decided whether or not SU was preserved. When the result of decision is YES, addition of SU to a preservation list is required (Step S19) before the system 10 brings the routine of the present processing to end.

In Step S14, it is decided whether or not SU has been watched. When the result of decision is YES, addition of SU to a watched program list is required (Step S20) before the system 10 brings the routine of the present processing to end.

In Step S15, it is decided whether or not SU is programmed to be recorded. When the result of decision is YES, addition of SU to a recording schedule list is required (Step S21) before the system 10 brings the routine of the present processing to end.

In Step S16, it is decided whether or not SU is in the process of reservation. When the result of decision is YES, addition of SU to an in-reservation list is required (Step S22) before the system 10 brings the routine of the present processing to end.

In Step S17, it is decided whether or not SU is watching (reproduction)-enable data. When the result of decision is YES, addition of SU to a reproduction-enable data list is required (Step S23) before the system 10 brings the routine of the present processing to end.

All the above lists are not always required. As a matter of course, "the preservation list" and "the in-reservation list" or the like, for instance, may be omitted, if not needed as functions.

Figure 13:
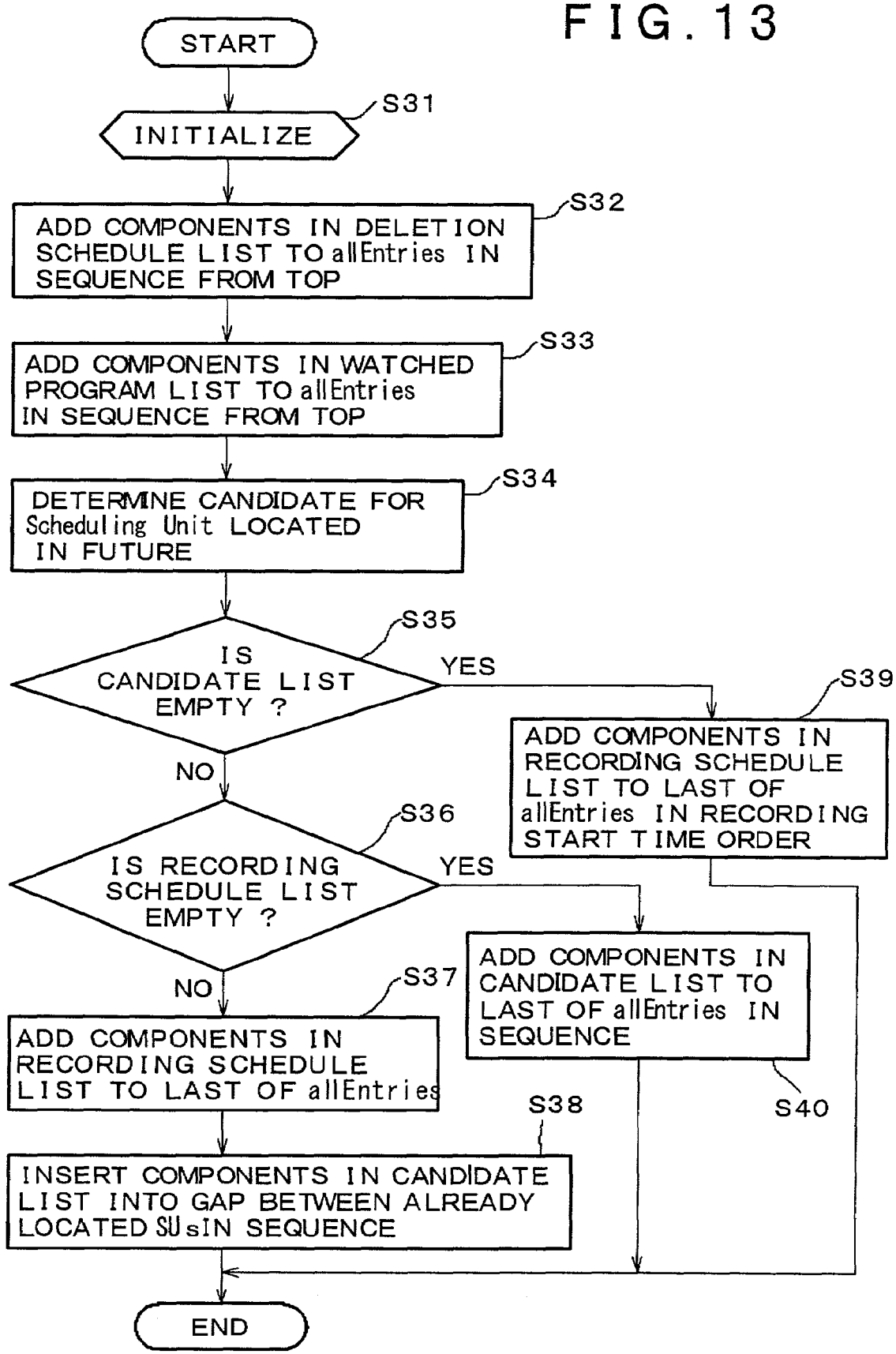
FIG. 13 is a flow chart showing a procedure of locating scheduling units in a schedule table of the virtual channels.

A description will now be given of the procedure of locating each sorted SU in the schedule table of the associated virtual channel with reference to the flow chart shown in FIG. 13.

As set-up operations, a list "allEntries" for storing SU contained in the associated virtual channel in time-series array is cleared, and a base time "baseTime" of the schedule table (that is, a time to start reproduction of SU in the forefront) and the total schedule length "totalLength" are set to initialize a current schedule time "curTime" to zero (Step S31).

Subsequently, components in the deletion schedule list are added from the top to the list "allEntries" (Step S32). In a case of addition, there is the need for setting "curTime" for "startTime" of the component SU to add "durationTime" of SU to "curTime".

Subsequently, components in the watched program list are added from the top in sequence to the list "allEntries" (Step S33). In a case of addition, there is also the need for setting "curTime" for "startTime" of the component SU to add "durationTime" of SU to "curTime", similarly to Step S32.

The above processing is considered to be fitted for a group of Scheduling Units located in the time period of "Past" on the time base of the associated virtual channel. On the other hand, the following processing is required for scheduling in "Future". Incidentally, the embodiment shown in FIG. 13 has no description of addition of components in the preservation list for the reason that the processing contents are substantially similar to those in Steps S32 and S33.

In Step S34, candidates for "Scheduling Unit" located in the time period of "Future" on the time base are selected from the reproduction-enable data list and the in-reservation list to add the selected candidates to a candidate list in descending order of priorities. The processing in Step S34 may be, for instance, by a method of selecting only a portion of programs having been on the air within recent 24 hours as candidates from the reproduction-enable data list, or selecting the components in the in-reservation list as candidates preferentially. However, since the whole schedule length is limited, all components in the candidate list are not always scheduled.

Subsequently, in Step S35, it is decided whether or not the candidate list is empty of candidates. When the result of decision is YES, the processing is advanced to Step S39. On the other hand, the result of decision is NO, the processing is advanced to Step S36.

In Step S39, the components in the recording schedule list are added to the last of "allEntries" in the recording start time order. In case of addition, there is the need for setting "startTime" of the component SU to be "startTime"=(Recording start time–baseTime) (that is, a relative time from baseTime). An overlap of a plurality of SUs in point of time, if occurs, may be prevented by shifting any of overlapped SUs behind to change "startTime". It is not necessary to add any components of the recording schedule list, if being empty.

On the other hand, in Step S36, it is decided whether or not the recording schedule list is empty. When the result of decision is YES, the processing is advanced to Step S40. On the other hand, when the result of decision is NO, the processing is advanced to Step S37.

In Step S40, components in the candidate list of "Scheduling Units" to be located in the time period of "Future" on the time base are added to the last of "allEntries" in sequence. In a case of addition, there is the need for setting "curTime" for "startTime" of the component SU to add "durationTime" of SU to "curTime". When "curTime" does not reach "totalLength", repetitive addition of component SU in the candidate list to the last of "allEntries" is required again. In this case, addition of "duplicate" SU' of components is also required. The above components may be added in the same or different order as or from the previously described order. In a case of addition, there is the need for setting "curTime" for "startTime" of SU' to add "durationTime" of SU' to "curTime" for repetitive addition until "curTime" exceeds "totalLength". The reason for the need of "duplicate" SU' is because SU, although being associated with the same program, is different in contents such as "startTime".

On the other hand, in Step S37, components in the recording schedule list are added to the last of "allEntries" in the recording start time order. In a case of addition, there is the need for setting "startTime" of the component SU to be "startTime"=(Recording start time–"baseTime") (that is, a relative time from "baseTime"). An overlap of a plurality of SUs in point of time, if occurs, may be prevented by shifting any of SUs behind to change "startTime". As a result, the components in the recording schedule list may be located in time-series between "curTime" and "totalLength".

Subsequently, in Step S38, the components in the candidate list are inserted sequentially into a gap between already located SUs. If the components are too much to be received in the gap, the already located SUs subsequent to the associated SU are set to shift behind before insertion. In a case of insertion and shifting, there is the need for setting "startTime" of the associated SU to appropriately update "curTime" so as to represent the start position of the next gap. The repetitive processing is required for the above updating until "curTime" exceeds "totalLength", that is, the schedule table is filled with "Scheduling Units".

Figure 14:
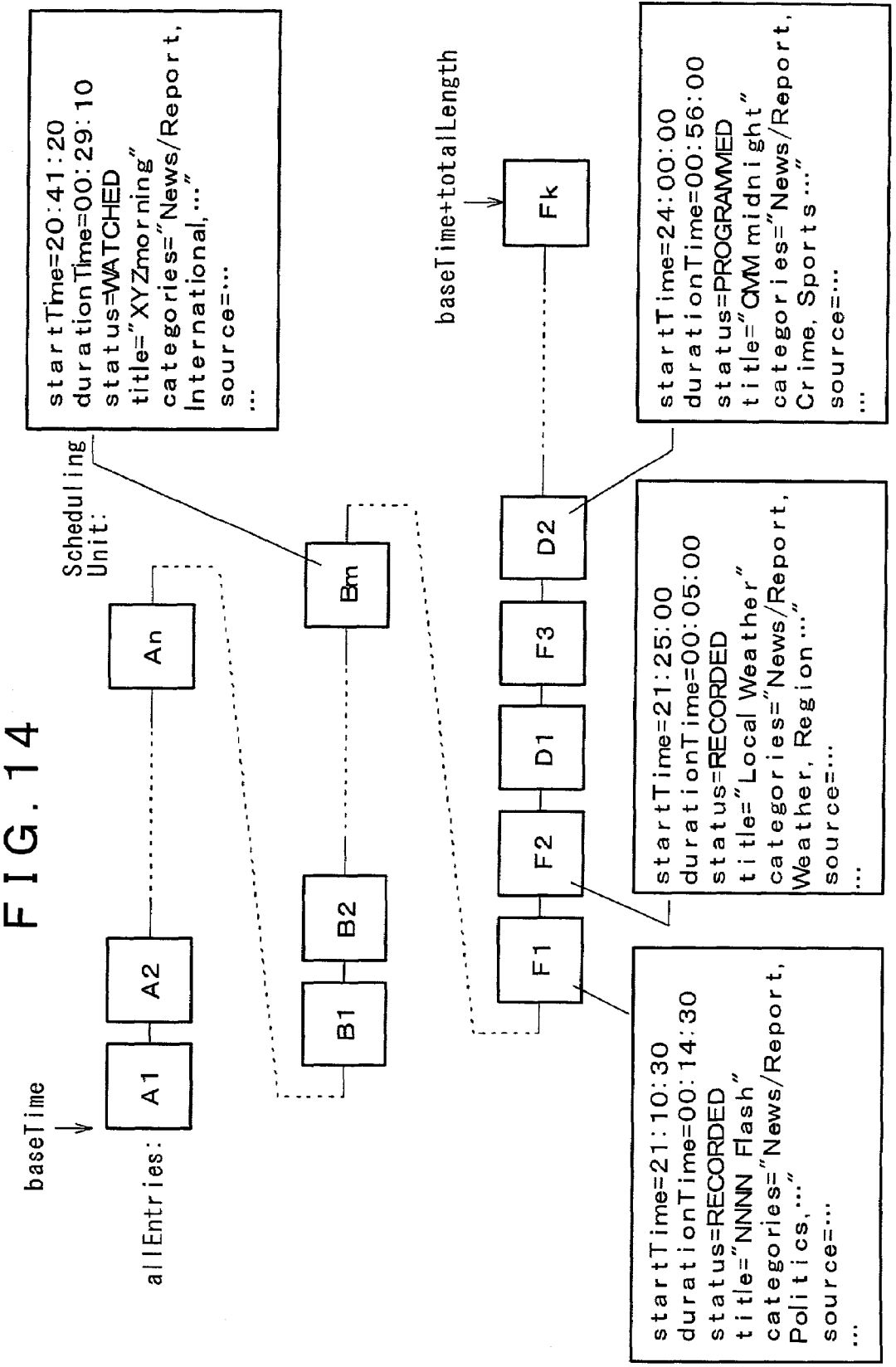
FIG. 14 is a view showing a schedule list in each virtual channel, together with components of the list.

A time-series list of "Scheduling Units" is generated through the above processing. FIG. 14 shows the configuration of "Scheduling Unit". "Scheduling Unit" is referred to a time-series list, which is considered to be equivalent to the program reproduction schedule table of the associated virtual channel. The time-series list is configured closely to be free from any over lap in point of time, permitting continuous reproduction of a plurality of programs. The "fast forward" and "rewind" operations across a plurality of programs may be also easily practicable.

Figure 15:
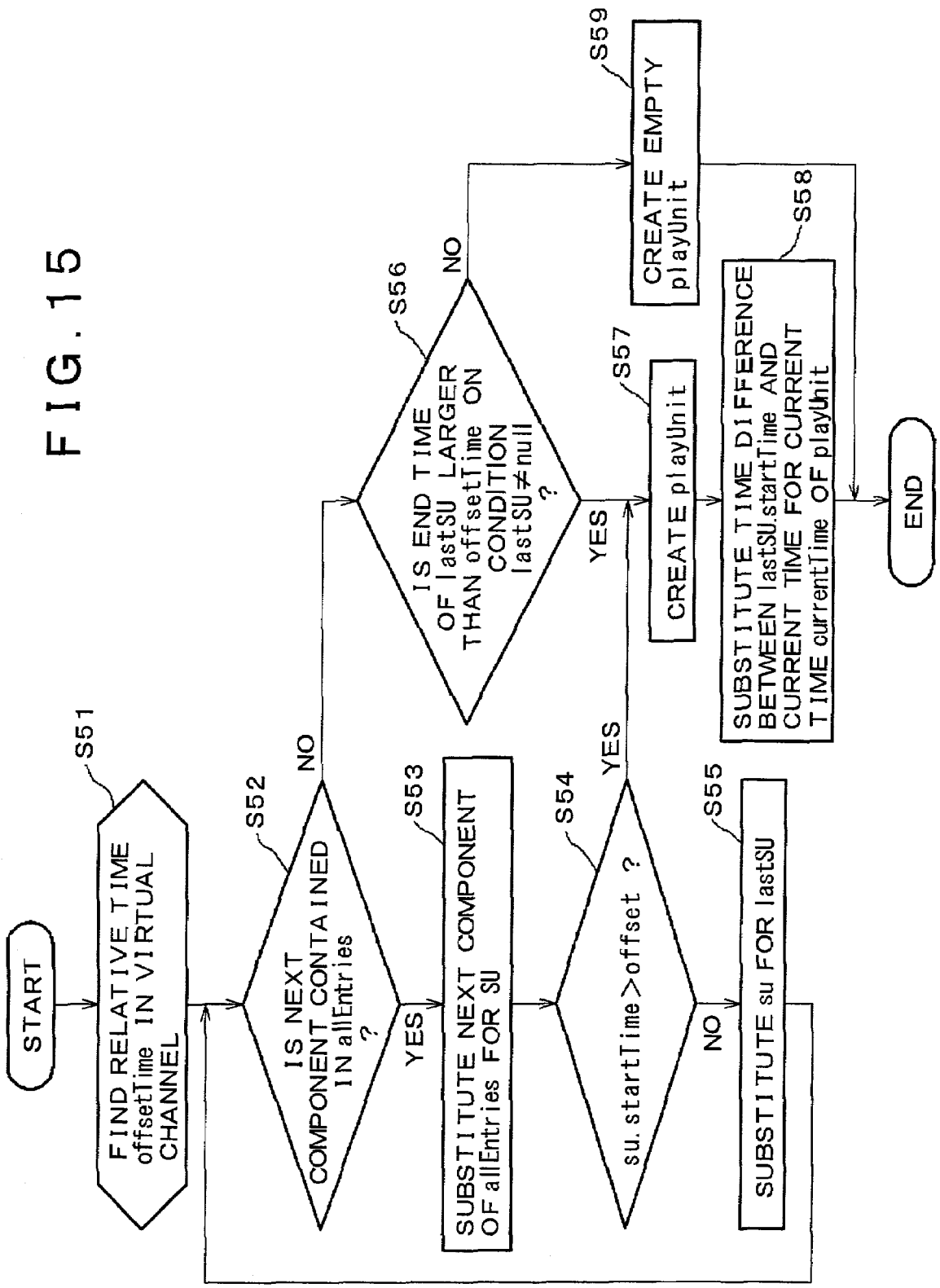
FIG. 15 is a flow chart showing a procedure of specifying a video to be now reproduced on the basis of a schedule table.

A description will now be given of the procedure of specifying a target video for reproduction at present on the basis of the schedule table generated by the above processing with reference to FIG. 15.

As set-up operations, the associated virtual channel base time "baseTime" is subtracted from the current time "curTime" to find a relative time "offsetTime" in the virtual channel (Step S51). A variable "lastSU" is also initialized to null.

Subsequently, it is decided whether or not the next component is contained in "allEntries" of the associated virtual channel (Step S52). When the result of decision is YES, the processing is advanced to Step S53. On the other hand, when the result of decision is NO, the processing is advanced to Step S56.

In Step S53, the next component of "allEntries" is substituted for a variable "su". Then, in Step S54, "su.startTime" is compared with "offsetTime". When the former is larger than the latter, the processing is advanced to Step S47. On the other hand, when being smaller, the processing is advanced to Step S55.

In Step S55, "su" is substituted for "lastSU", before the processing is restored to Step S52 to repeat the above processing with respect to the next component of "allEntries".

When it is ascertained in Step S52 that the next component is not found in "allEntries", the processing is advanced to Step S56 to decide whether the last time of "lastSU" (lastSu+lastSu.duration time) is larger than "offsetTime" on condition that "lastSU" is not equal to null. When the result of decision is YES, the processing is advanced to Step S57. On the other hand, when the result of decision is NO, the processing is advanced to Step S59.

When it is ascertained that the result of decision in Step S56 is YES, "lastSU" is considered to be equivalent to the current program, permitting creation of "playUnit" on the basis of program information shown by "source" of "lastSU" in Step S57.

In Step S58, substitution of a time difference (=offsetTime−last SU.startTime) from "lastSU.startTime" to the current time for "currentPosition" of "playUnit" is required before the system 10 brings the whole routine of the present processing to end.

On the other hand, when it is ascertained that the result of decision in Step S56 is NO, "lastSU" is considered to be not equivalent to any program. Thus, generation of an empty "playUnit" is required in Step S59 before the system 10 brings the whole routine of the present processing to end. In such a case, no reproduction occurs on the virtual channel, while no display also occurs on the display 61.

When "playUnit" generated in this manner is taken out, the processing for reproduction and display is started from "currentPosition" of "playUnit". This is referred to the function of a general video player.

Incidentally, although not described in the above embodiment, the above procedure may also be applied to a case of requiring the "fast forward" and "rewind" operations in the manner of accumulating a time difference resulting from the "fast forward" and "rewind" operations in a variable referred to "shiftTime" to thereby subtract "shiftTime" from "baseTime" in a case of finding "offsetTime" in Step S51. That is, "offsetTime" as shown by the following expression (1) is good enough for use.

$$\text{offsetTime} = \text{CurTime} - (\text{baseTime} - \text{shiftTime}) \quad (1)$$

Figure 22:
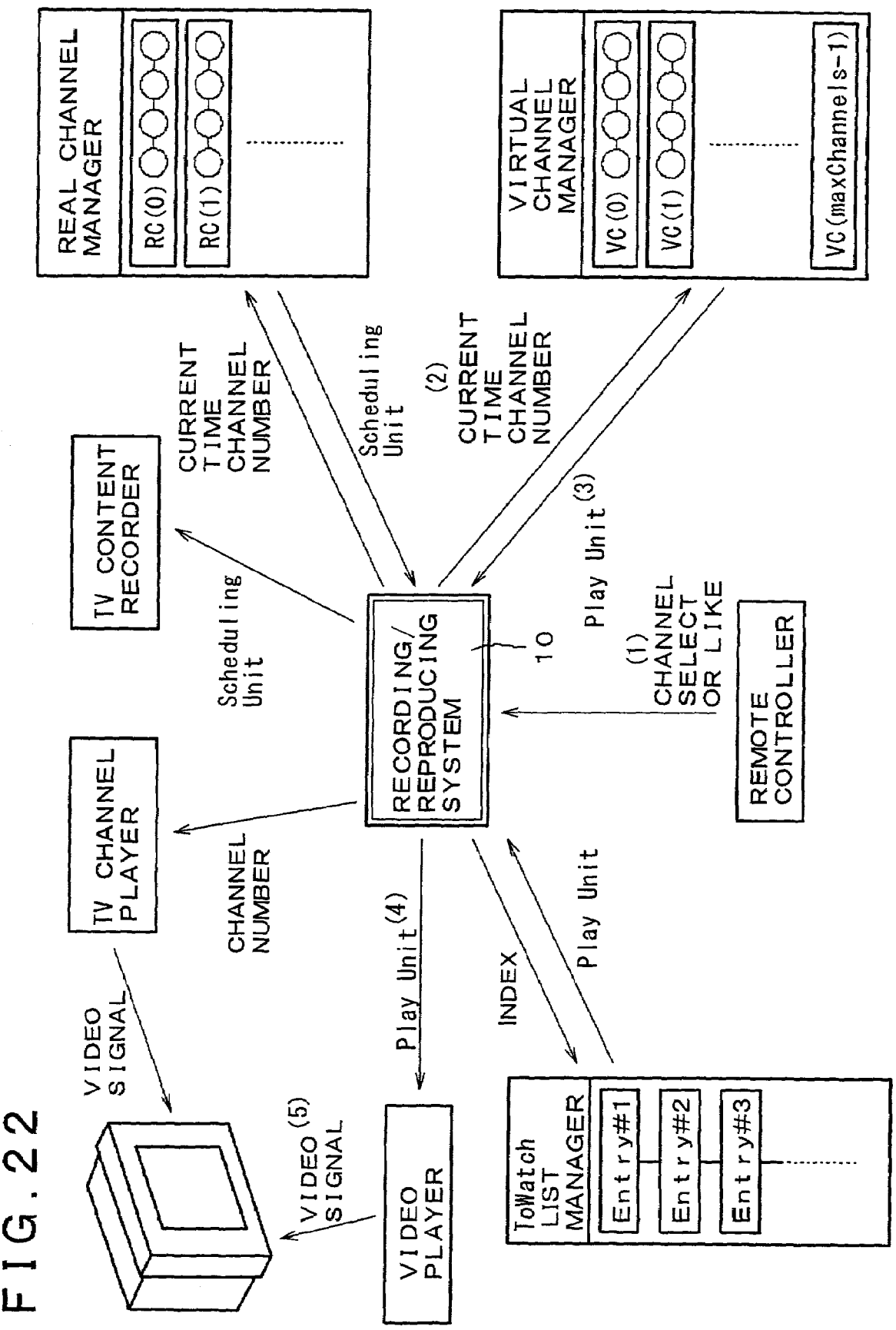
FIG. 22 is a view showing the procedure of receiving programs of real channels, together with the procedure of reproducing programs in virtual channels in the recording/reproducing system 10 according to the embodiment of the present invention.

FIG. 22 illustrates the procedure of receiving programs in the real channels, together with the procedure of reproduction of programs in the virtual channels in the recording/reproducing system 10 according to the embodiment of the present invention. A description will now be given mainly of the procedure of reproduction of programs in the virtual channels.

(1) The user operates the operation panel of the remote controller 60 or the like for the channel switching operation.
(2) The recording/reproducing system 10 provides a current time and a channel number (channel#) to a virtual channel manager in response to the channel switching operation.
(3) The virtual channel manager creates "playUnit", which may be set as a return value for the system 10, according to "the procedure of specifying the target video for reproduction at present on the basis of the schedule table" described the above (Refer to FIG. 15).
(4) The system 10 transfers "playUnit" to the video player.
(5) The video player reproduces the video on the basis of "playUnit" information for display onto the screen of the display 61.

Incidentally, in FIG. 22, the virtual channel manager, a real channel manager and a "To Watch list" manager may be supposed to be substantially programs executed by the CPU 11 in the recording/reproducing system 10. Also, "TV content recorder" and "Video player" may be brought into practice in the form referred to recording/reproducing functions of storing or taking out the TV contents in or from the HDD 17 according to the instructions from the CPU 11.

FIG. 16 shows the configuration of "Scheduling Unit". "Scheduling Unit" is a collection of scheduling information for programs recorded or programmed to record and includes at least the following components as shown in FIG. 16.

(1) startTime:
  Reproduction start time in the schedule table:
(2) durationTime
  Length of program:
(3) status:
  Status (inclusive of status of program contents programmed to delete, watched, programmed to record, in process of reservation and enabling reproduction):
(4) title:
  Title of program (for use in display of a schedule list):
(5) categories:
  Categories of programs (Setting of a plurality of categories is applicable):
(6) source:
  Program constituting a source of the associated scheduling:

FIG. 17 shows the configuration of "Play Unit". "Play Unit" is a collection of information for reproduction of a certain program and includes at least the following components as shown in FIG. 17.

(1) media:
  Recorded video data; Absence of this data may occur in the current time in a case of programming to record.
(2) startPosition:
  Start position of the associated program from the head of media: A plurality of programs may be contained in one media.
(3) durationTime
  Length of program:
(4) currentTime
  Current reproduction position from the head of media: Updating of "currentTime" occurs momently in the process of reproduction. The reproduction start position is specified according to "the procedure of specifying the target video for reproduction at present on the basis of the schedule table" (Refer to FIG. 15), when switching over from another channel is brought into practice. The video player starts reproduction from this position.

FIG. 18 shows the configuration of program information "TVcontent". The program information "TVcontent" is generated on the basis of a variety of information relating to individual programs distributed through EPG or the like and includes the following components as shown in FIG. 18.

(1) id:
  Identification information for identifying programs:
(2) startTime
  Broadcasting start time:
(3) endTime
  Broadcasting end time:
(4) channel:
  Broadcasting channel number:
(5) title:
  Title of program:
(6) categories:
  Categories of program: A plurality of categories may be set for an individual program.
(7) description:
  Detailed information relating to programs:
(8) media:
  Recorded video data, which is set in recording.
(9) mediaOffset:
  Start position of the associated program from the head of media: A plurality of programs may be contained in one media.
(10) status:
  Status relating to preservation and reproduction for watching of program contents, inclusively of the status of program contents programmed to delete, in process of reservation, preserved, recorded and programmed to record:
(11) reservedTime
  Reservation time which is a component available only when status of the program contents in reservation is selected.

The components (1) to (7) among the above components of "TVcontent" are provided through EPG or the like in data broadcasting service. On the other hand, other components need to be set arbitrarily in the recording/reproducing system 10.

The component (1) "id" is configured by a combination of series id and each broadcasting time id, for instance, and may be applied to define the programs clearly as the same series of programs or to automatically record the same series of programs without any omission or to continuously reproduce the same series of programs on the same virtual channel.

The component (10) "status" may be set automatically with the recording/reproducing system 10 or manually by the user in the manner of touching the "deletion" button on the operation panel of the remote controller 60 of the like.

Figure 19:
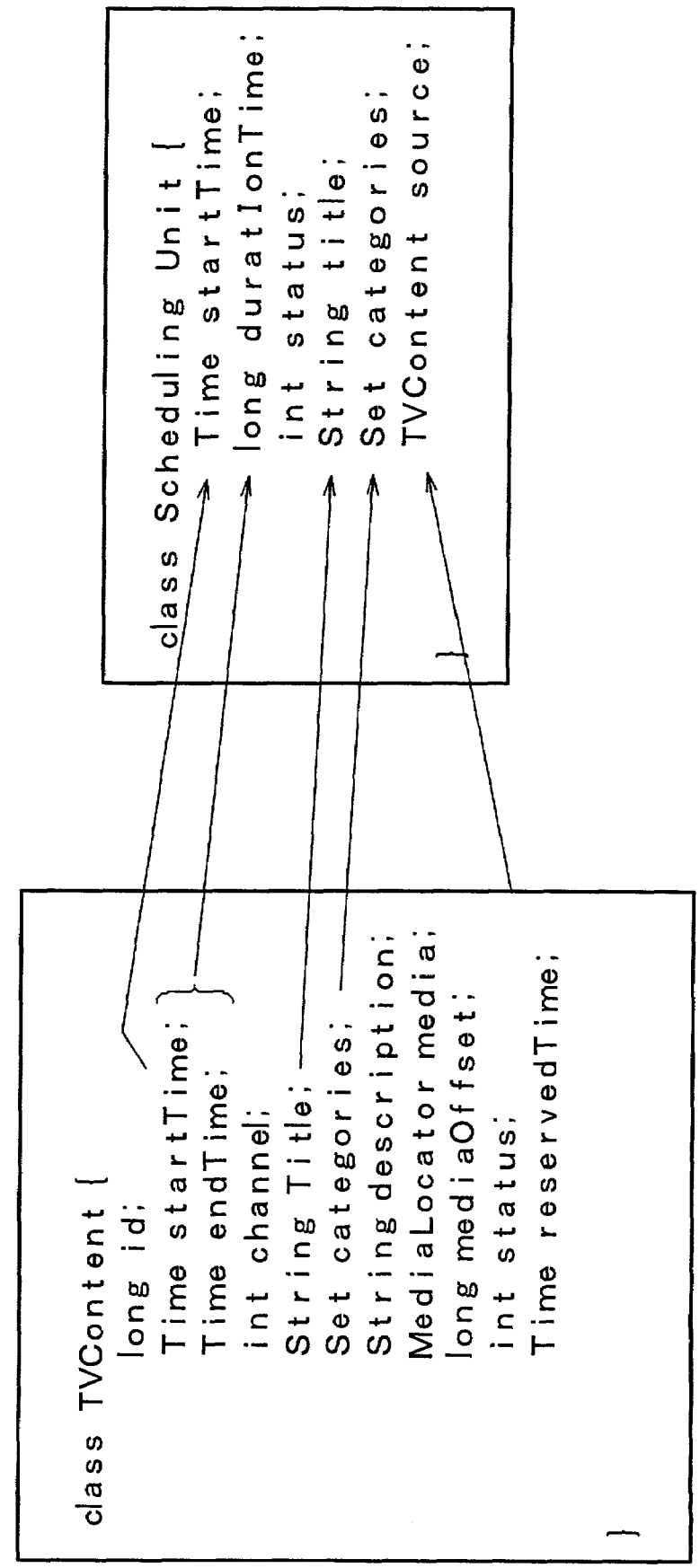
FIG. 19 is a view schematically showing a flow of data in a case of generating Scheduling Unit on the basis of "TVContent"

FIG. 19 schematically shows the flow of data in case of generating "scheduling" on the basis of "TVcontent".

The "durationTime" of the "Scheduling Unit" is calculated on the basis of a difference between "startTime" and "endTime" of "TVcontent".

Further, "startTime", "title" and "categories" are copied intact from "TVcontent" to "Scheduling Unit.

Further, the "source" of the "scheduling" holds a reference to the corresponding the "TVcontent". The "title" and "categories" are considered to be redundant components and therefore, may be configured to be referred to one after another through the "source" by deleting a field, if the user does not care about efficiency.

The "startTime" of the "Scheduling Unit" holds the program broadcasting time as an initial value, while being updated in scheduling. The "status" is also updated on the recording/reproducing system 10 in recording and so on.

Figure 20:
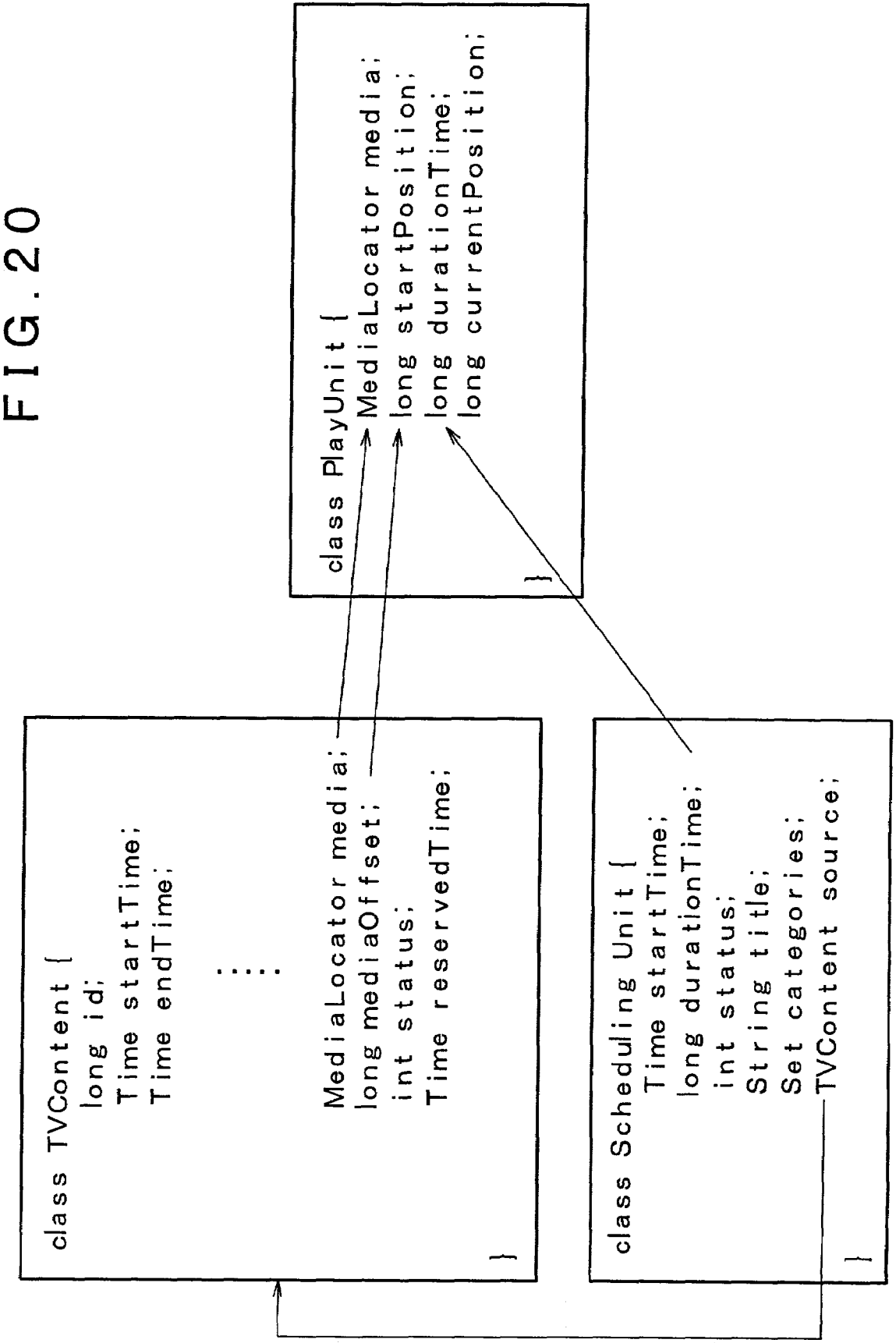
FIG. 20 is a view schematically showing a flow of data in a case of generating Play Unit on the basis of Scheduling Unit.

FIG. 20 schematically shows the flow of data in a case of generating the "Play Unit" on the basis of the "Scheduling Unit".

The "durationTime" of the "Scheduling Unit" is copied onto the "durationTime" of the "Play Unit".

Further, the "media" and the "mediaOffset" are respectively copied from the "TVcontent" onto the "media" and the "startPosition" of the "Play Unit" through the "source" of the "Scheduling Unit".

Further, the "currentPosition" of the "Play Unit" is initialized to zero, while being updated at any time on the recording/reproducing system 10.

FIG. 21 shows the components of the "ToWatchEntry" added to the "To watch list" (Refer to FIG. 10).

(1) currentPosition:
  Current position:
(2) title:
  Title of program:
(3) durationTime
  Length of program:
(4) status:

Current program status, inclusive of the status of the program in the process of being paused and reproduced or the like.

(5) source:
  Corresponding program information ("TVcontent")

In the embodiment of the present invention, the "ToWatchEntry" is created every paused program for addition to the "To Watch list". The "To watch list" manager uses such information to provide a display of the title of the reproducing program in the process of reservation for the "To Watch list" (Refer to FIG. 10). On the other hand, the user may resume (or start) the interrupted program reproduction by selecting any program from the list box.

The "To watch list" may also be configured to be placed in a non-volatile hold state for the duration of disconnection of power from the system, or alternatively to delete a specific entry from the "To Watch list" according to the explicit instructions from the user.

As has been described in the foregoing, the present invention makes it possible to provide the recording/reproducing system, which is satisfactory to permit the automation of video recording and recording schedule reservation of programs sent on the air from the broadcasting stations.

The present invention also makes it possible to provide the recording/reproducing system, which is satisfactory to support the reproduction and watching operations of a large number of automatically recorded videos.

The present invention further makes it possible to provide the recording/reproducing system, which is satisfactory to permit the facilitation of selection and management of recorded videos in the manner of following the operations of general AV equipment such as televisions and video decks.

The present invention further makes it possible to provide the recording/reproducing system, which is satisfactory to permit the reflection on management of preservation of recorded videos while grasping user's intention accurately.

According to the present invention, the recorded videos are sorted into categories, and the virtual channels may be assigned to the categories. Since only the programs suited to a specific category may be recorded into the virtual channel, if configured according to the category defined by the user, the user oneself may estimate with higher accuracy what kind or content of programs are included in which channel. Further, when there is the need for sharing the recording/reproducing system among a plurality of users for domestic use or the like, the virtual channels may be assigned every user as well.

The recorded programs are set in array on the time base on each virtual channel, permitting concurrent reproduction on each virtual channel. On the other hand, the virtual channels having no chance to bring watching into practice by the user are good enough to advance the reproduction start point on the occasion of channel selection with the lapse of real time, without the need for activating the process of reproducing the recorded programs programmed to reproduce at the pertinent time. The user may happen to watch various recorded programs only through the operation of switching over the channels from one to another or continuing to reproduce the recorded programs on a certain one channel after application of power at any time. It is to be understood that a quite passive style is sufficient for the user to watch the recorded programs.

The recording/reproducing system according to the present invention permits the user to watch the recorded programs only through the operation which is quite familiar to the general television receiver like the channel switching operation. That is, it is not necessary for the user to learn a new operating method other than the channel switching operation, and besides, an active operation or watching pose is not required for the user to reproduce the recorded videos. Thus, the recording/reproducing system of the present invention is easily acceptable to the user having the passive watching style and also permits a reduction in number of simply recorded programs kept idle without a chance to be reproduced.

The recorded videos reproduced on the virtual channels are stored in the high-speed random-accessible recording media such as HDD, permitting an access to a desired reproduction start point at high speed through the "fast forward" and "rewind" operations. Further, since the recording/reproducing system according to the present invention adopts well-experienced operation modes such as the "fast forward" and "rewind" operations of the video deck, the user does not need to learn a new operating method.

The recording/reproducing system of the present invention may reflect the priority of each recorded program on scheduling of programs to reproduce on the virtual channels to control the number of times and the time period to arrange the programs. The recording/reproducing system, if sets the priority of each program on the basis of the user's tastes and profile information, for instance, makes it possible to locate the programs, supposed to be desired to watch by the user in particular, in the prime time or like time period quite within the bounds of the possibility that the user might watch the programs on television, permitting the improvement of probability that the user might catch one's attention on the programs. Thus, the recording/reproducing system of the present invention is considered to be excellent in facility.

The recording/reproducing system of the present invention makes it possible to manage information to the effect that which reproduced program was watched by the user on the system. Thus, the recording/reproducing system, if configured to prevent the programs once having been watched from being incorporated into the period of the future on the time base of the virtual channel, may eliminate the useless action of watching the same program over and over.

Since the recorded programs are set in array according to their status (i.e., the state of programs programmed to record, recorded and programmed to delete or the like) every virtual channel, the user may watch the programs continuously or select the operation object simply through the "fast forward", "rewind" or like unified well-experienced operation. The user may search and specify the desired program to reproduce by intuition without the need for watching the screen for the view of programs.

The recording/reproducing system according to the present invention makes it possible to apply a plurality of program tables such as lists of recording schedule programs, recorded programs and deletion schedule programs (restorable) to single scheduling of programs to reproduce in the unified manner. Thus, the user gains an access to the desired programs to reproduce continuously (i.e., a series of programs such as serial drama) only through the fast forward, rewind or like unified operation while following only a list of a single kind of programs with eyes without the need for switching the screen every purpose. The user may give instructions to delete, preserve and reserve the recorded programs and also to cancel each operation by touching the buttons of the remote controller while watching the reproduced videos, resulting in no need for display of the reproduced videos onto the individual operation screens through switch-over operation. Thus, the recording/reproducing system of the present invention, if configured to locate a series of programs continuously on the same channel, permits the user to watch the series of programs together and besides, may prevent the simply recorded programs from being kept idle.

On the program-scheduled virtual channel in the recording/reproducing system according to the present invention, the programs having been watched by the user are located in the period of "the near past" on the time base every channel. Thus, the user may search by intuition the programs in such a way as to find "the program having been once watched previously" through the "rewind" operation on the same channel. Further, since the program having been watched by the user more recently is located in the period of the "nearer past" on the time base, such an array of programs may be easily understood in view of a human mechanism of memory. On the other hand, since the program programmed to be deleted is located in the period of "the remote past" every channel, the user gains an access to a desired recorded program according to a unified method.

The recording/reproducing system according to the present invention makes it possible to hold paused information relating to the programs in the process of being paused as a list independent of the channel operation. Thus, a random access to the recording media such as a hard disk may be applied to resume the reproduction of paused program quickly at any time. The processing of resuming the reproduction of paused program as described the above requires no channel switching nor "fast forward" and "rewind" operations of the recording media. Further, the paused information is added to or deleted from the list automatically in response to the instructions given by the user to pause the programs or resume the reproduction, it is not necessary for the user oneself to mark or tag the programs for storage, permitting the simplification of operations.

The recording/reproducing system of the present invention, if configured to hold the storage list of the paused information in a non-volatile manner even for the duration of disconnection of power, makes it possible to resume the reproduction of programs in the future (that is, after the lapse of a considerable period of time). Since it is assumed that the user has a mind to resume the reproduction of programs when bringing the pausing operation into practice explicitly, no operational inconvenience in such operation is considered. Further, the recording/reproducing system of the present invention, if configured to hold the information of videos in the process of being paused as the list (i.e., the "To Watch list") independent of the ordinary channel operation, makes it possible to prevent interference with the reproduction of the other programs on the same channel.

While the invention has been described in detail with reference to the specific embodiments, it is to be understood that various changes and modifications will be apparent to those skilled in the art without departing from the spirit and scope of the present invention. That is, having described the invention as related to the embodiment, it is to be understood that the invention be not limited to any of the details of the above description. The scope of the invention is therefore to be determined solely by the appended claims.

What is claimed is:

1. A system for recording and/or reproducing programs received or programmed to be received, comprising:
    program sorting means for sorting said programs into categories according to a predetermined rule;
    virtual channel management means for assigning virtual channels to respective categories, and for setting said programs, sorted into said categories, in sequential order on the assigned virtual channels;
    program recording means for recording said programs in the respective categories on the assigned virtual channels or programming a recording schedule thereof;
    user operation means for accepting user-based channel select operation and/or program search operation on said virtual channels; and
    program presentation means for extracting a corresponding program for reproduction from a selected virtual channel in response to user operations accepted through said user operation means,
    wherein time base for display of each virtual channel advances when the virtual channels are not displayed.

2. A system for recording and/or reproducing programs according to claim 1,
    wherein an entry of the categories of said virtual channels is made according to user profiles or user instructions.

3. A system for recording and/or reproducing programs according to claim 1,
    wherein said virtual channels include a virtual channel for an array of programs, which are not included in a category.

4. A system for recording and/or reproducing programs according to claim 1,
    wherein said program sorting means sorts said programs into categories according to EPG (Electronic Programming Guide) or user instructions.

5. A system for recording and/or reproducing programs according to claim 1,
    wherein the reproduction start order of the programs on the virtual channels is in conformity with a priority established in accordance with at least one of an on-the-air program order, user profiles and user instructions.

6. A system for recording and/or reproducing programs according to claim 1,
    wherein said virtual channel management means shifts reproduction start positions on the virtual channels being selected and non-selected with the lapse of real time.

7. A system for recording and/or reproducing programs according to claim 1,
    wherein said user operation means accepts program search operations including pause, fast forward and rewind of reproduction positions on the virtual channels.

8. A system for recording and/or reproducing programs according to claim 1,
    wherein said user operation means accepts operations of specifying a program preservative status, inclusively of deletion, preservation and reservation, for subsequent watching, relating to specific programs on the virtual channels.

9. A system for recording and/or reproducing programs according to claim 1,
    wherein said virtual channel management means manages the preservative status of the programs set in array on the virtual channels.

10. A system for recording and/or reproducing programs according to claim 1,
    wherein said virtual channel management means identifies each program set in array on the virtual channels as one watched by the user or not.

11. A system for recording and/or reproducing programs according to claim 1,
    wherein said virtual channel management means locates the programs on the virtual channels according to a specified preservative status with respect to each of the recorded programs.

12. A system for recording and/or reproducing programs according to claim 1,
    wherein said virtual channel management means locates a program, identified as one watched, in a period of a near past on a time base on the associated virtual channel.

13. A system for recording and/or reproducing programs according to claim 1,
    wherein said virtual channel management means locates a program, identified as one programmed to be deleted, in a period of a remote past on a time base on the associated virtual channel.

14. A system for recording and/or reproducing programs according to claim 1,
    wherein said virtual channel management means locates a program, identified as one preserved, in a period of a slightly remote past on a time base on the associated virtual channel.

15. A system for recording and/or reproducing programs according to claim 1,
    wherein said virtual channel management means locates a program, identified as one programmed to be recorded, in a period of a future, provided that a point on and after a date is required, on a time base on the associated virtual channel.

16. A system for recording and/or reproducing programs according to claim 1,
    wherein said virtual channel management means locates a program, identified as one remaining recorded without being watched, in a period of a future available time on the associated virtual channel.

17. A system for recording and/or reproducing programs according to claim 1, wherein said virtual channel management means locates a program, identified as one in process of reservation, in a period of a future available time on the associated virtual channel preferentially.

18. A system for recording and/or reproducing programs according to claim 1,
wherein said virtual channel management means displays scheduling of programs on each virtual channel and a viewing status and a preservative status of each program in a form of being readily identified.

19. A system for recording and/or reproducing programs according to claim 1,
wherein said virtual channel management means locates a series of programs on a same virtual channel continuously.

20. A system for recording and/or reproducing programs according to claim 1,
wherein said virtual channel management means shifts a reproduction start position on the virtual channel in a process of being selected to a period of a future or a past on a time base in response to fast forward or rewind instructions supplied through said user operation means.

21. A system for recording and/or reproducing programs according to claim 1,
wherein said virtual channel management means inhibits fast forward operation for a program corresponding to one earlier than a date.

22. A system for recording and/or reproducing programs according to claim 1,
wherein said virtual channel management means shifts a reproduction start position on the virtual channel in a process of being selected to a period of a future or a past on a time base in response to fast forward or rewind instructions supplied through said user operation means, while setting a reproduction start position on the virtual channel in a process of not being selected so as to follow the lapse of real time.

23. A system for recording and/or reproducing programs according to claim 1, further comprising
real channel management means for assigning real channels to programs,
wherein said program presentation means removes the recorded program for reproduction from the virtual channel selected through said user operation means in response to the selection of said virtual channel, while presenting the program on the real channel selected through said user operation means in response to the selection of said real channel.

24. A system for recording and/or reproducing programs according to claim 23,
wherein said user operation means accepts a channel select operation without a distinction between the real channels and the virtual channels.

25. A system for recording and/or reproducing programs according to claim 1, further comprising:
management means for managing reproduction information relating to programs paused on each virtual channel.

26. A system for recording and/or reproducing programs according to claim 25,
wherein said management means displays a list of paused programs for accepting the user selection on the list, and starts reproduction of the corresponding recorded program in response to the user selection.

27. A method of recording and/or reproducing programs received or programmed to be received, comprising:

a program sorting step of sorting the programs into categories according to a predetermined rule;
a virtual channel management step of assigning virtual channels to respective categories, and of setting said programs, sorted into said categories, in sequential order on the assigned virtual channels;
a program recording step of recording the programs in the respective categories on the assigned virtual channels or programming a recording schedule thereof;
a user operation step of accepting a user-based channel select operation and/or a program search operation on the virtual channels;
a program presentation step of extracting a corresponding program for reproduction from a selected virtual channel in response to the user operation accepted through said user operation step; and
advancing a time base for display of each virtual channel when the virtual channels are not displayed.

28. A method of recording and/or reproducing programs according to claim 27,
wherein an entry of categories of the virtual channels is made according to user profiles and/or user instructions.

29. A method of recording and/or reproducing programs according to claim 27,
wherein said virtual channels include a virtual channel for an array of programs, which are not included in a category.

30. A method of recording and/or reproducing programs according to claim 27,
wherein said program sorting step sorts the programs according to EPG (Electronic Programming Guide) or user instructions.

31. A method of recording and/or reproducing programs according to claim 27,
wherein the reproduction start order of the programs on the virtual channels is in conformity with a priority established in accordance with at least one of program order, user profiles and user instructions.

32. A method of recording and/or reproducing programs according to claim 27,
wherein said virtual channel management step shifts reproduction start positions on the virtual channels being selected and non-selected in response to the lapse of real time.

33. A method of recording and/or reproducing programs according to claim 27,
wherein said user operation step accepts program search operations including pause, fast forward and rewind of reproduction positions on the virtual channels.

34. A method of recording and/or reproducing programs according to claim 27,
wherein said user operation step accepts operations of specifying a recorded program preservative status, inclusively of deletion, preservation and reservation, for subsequent viewing, of specific programs on the virtual channels.

35. A method of recording and/or reproducing programs according to claim 27,
wherein said virtual channel management step manages a preservative status of programs set in array on the virtual channels.

36. A method of recording and/or reproducing programs according to claim 27,
wherein said virtual channel management step identifies the programs set in array on the virtual channels as one watched by the user or not.

37. A method of recording and/or reproducing programs according to claim 27,
wherein said virtual channel management step locates the programs on the virtual channels in response to a specified preservative status with respect to each of the recorded programs.

38. A method of recording and/or reproducing programs according to claim 27,
wherein said virtual channel management step locates a program, identified as one watched, in a period recently past on a time base on the associated virtual channel.

39. A method of recording and/or reproducing programs according to claim 27,
wherein said virtual channel management step locates a program, identified as one programmed to be deleted, in a period past on the time base on the associated virtual channel.

40. A method of recording and/or reproducing programs according to claim 27,
wherein said virtual channel management step locates a program, identified as one preserved, in a period of a recently remote past on a time base on the associated virtual channel.

41. A method of recording and/or reproducing programs according to claim 27,
wherein said virtual channel management step locates a program, identified as one programmed to be recorded, in a period of a future, provided that a point on and after a date is required, on a time base on the associated virtual channel.

42. A method of recording and/or reproducing programs according to claim 27,
wherein said virtual channel management step locates a program, identified as one remaining recorded without being watched, in a period of a future available time on the associated virtual channel.

43. A method of recording and/or reproducing programs according to claim 27,
wherein said virtual channel management step locates a program, identified as one in process of reservation, in a period of a future available time on the associated virtual channel.

44. A method of recording and/or reproducing programs according to claim 27,
wherein said virtual channel management step displays scheduling of programs on each virtual channel and a watching status and a preservative status of each program in a form of readily identified.

45. A method of recording and/or reproducing programs according to claim 27,
wherein said virtual channel management step locates a series of programs on a same virtual channel continuously.

46. A method of recording and/or reproducing programs according to claim 27,
wherein said virtual channel management step shifts a reproduction start position on the virtual channel in a process of being selected to a period of a future or a past on a time base in response to fast forward or rewind instructions.

47. A method of recording and/or reproducing programs according to claim 27,
wherein said virtual channel management step inhibits fast forward operation for a program corresponding to one earlier than a schedule date.

48. A method of recording and/or reproducing programs according to claim 27,
wherein said virtual channel management step shifts a reproduction start position on the virtual channel in a process of being selected to a period of a future or a past on a time base in response to fast forward or rewind instructions, while setting the reproduction start position on the virtual channel in a process of being non-selected to follow the lapse of real time.

49. A method of recording and/or reproducing programs according to claim 27, further comprising:
a real channel management step of assigning real channels to programs, said program presentation step deletes the recorded program for reproduction from the virtual channel selected in response to a selection of said virtual channel, while presenting the program on the real channel selected in response to the selection of said real channel.

50. A method of recording and/or reproducing programs according to claim 49,
wherein said user operation step accepts a channel select operation without distinction between the real channels and the virtual channels.

51. A method of recording and/or reproducing programs according to claim 27, further comprising:
a management step of managing reproduction information relating to paused programs on each virtual channel.

52. A method of recording and/or reproducing programs according to claim 51,
wherein said management step displays a list of paused programs for accepting user selection on said list, and starts the reproduction of the corresponding recorded program in response to the user selection.

53. The apparatus as claimed in claim 1,
wherein time base for display of each virtual channel advances when the virtual channels are not displayed.

54. The apparatus as claimed in claim 1,
wherein the time advances independently and continuously on each virtual channel for the period of time when other virtual channels are selected.

55. The method as claimed in claim 27,
wherein the time base for display of each virtual channel advances when the virtual channels are not displayed.

56. The method as claimed in claim 27,
wherein the time advances independently and continuously on each virtual channel for the period of time when other virtual channels are selected.

* * * * *